United States Patent
Choi et al.

(10) Patent No.: US 10,176,029 B2
(45) Date of Patent: Jan. 8, 2019

(54) OPERATION METHOD OF STORAGE DEVICE, OPERATION METHOD OF HOST DEVICE, AND OPERATION METHOD OF USER SYSTEM INCLUDING STORAGE DEVICE AND HOST DEVICE

(71) Applicant: SAMSUNG ELECTRONICS CO., LTD., Suwon-si, Gyeonggi-Do (KR)

(72) Inventors: Jinhwan Choi, Seoul (KR); Younwon Park, Suwon-si (KR); Jeong-Woo Park, Yongin-si (KR); Youngmoon Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 215 days.

(21) Appl. No.: 15/081,128

(22) Filed: Mar. 25, 2016

(65) Prior Publication Data

US 2016/0378582 A1 Dec. 29, 2016

(30) Foreign Application Priority Data

Jun. 29, 2015 (KR) .................. 10-2015-0092376

(51) Int. Cl.
*G06F 11/00* (2006.01)
*G06F 11/07* (2006.01)
*G06F 13/00* (2006.01)
*H04L 29/08* (2006.01)

(52) U.S. Cl.
CPC ...... *G06F 11/0727* (2013.01); *G06F 11/0784* (2013.01); *G06F 13/00* (2013.01); *H04L 67/1078* (2013.01)

(58) Field of Classification Search
CPC .................. G06F 11/0727; G06F 11/0784
See application file for complete search history.

(56) References Cited

U.S. PATENT DOCUMENTS

| | | | |
|---|---|---|---|
| 6,094,729 A | 7/2000 | Mann | |
| 6,336,195 B1 | 1/2002 | Shen et al. | |
| 7,099,280 B1 * | 8/2006 | Shaffer | G10L 25/69 |
| | | | 370/252 |
| 7,627,784 B1 * | 12/2009 | Allen | G06F 11/3636 |
| | | | 714/30 |
| 7,679,133 B2 | 3/2010 | Son et al. | |

(Continued)

FOREIGN PATENT DOCUMENTS

KR 10-2013-0042370 A 4/2013

*Primary Examiner* — Bryce P Bonzo
*Assistant Examiner* — Katherine Lin
(74) *Attorney, Agent, or Firm* — Volentine, Whitt & Francos, PLLC

(57) ABSTRACT

An operation method is for a storage device that includes a storing unit storing a plurality of error logs and a physical layer and exchanges an electrical signal with a host via the physical layer. The operation method includes receiving a debugging command from the host, setting a first value at a first attribute included in the physical layer in response to the debugging command, setting a second value different from the first value at the first attribute in response to a control of the host, setting one among the plurality of error logs at a second attribute based on the first attribute at which the second value is set, and transmitting the error log set at the second attribute to the host in response to a control of the host.

19 Claims, 19 Drawing Sheets

(56) References Cited

U.S. PATENT DOCUMENTS

| | | |
|---|---|---|
| 8,467,735 B2 | 6/2013 | Giles et al. |
| 8,553,466 B2 | 10/2013 | Han et al. |
| 8,559,235 B2 | 10/2013 | Yoon et al. |
| 8,654,587 B2 | 2/2014 | Yoon et al. |
| 9,026,854 B2 | 5/2015 | Jeong et al. |
| 2011/0233648 A1 | 9/2011 | Seol et al. |
| 2013/0238935 A1 | 9/2013 | Radulescu |
| 2013/0275811 A1 | 10/2013 | Wong et al. |
| 2014/0229644 A1 | 8/2014 | Thanigasalam et al. |
| 2014/0281753 A1 | 9/2014 | Wagh et al. |
| 2014/0289434 A1 | 9/2014 | Ranganathan et al. |
| 2014/0366153 A1 | 12/2014 | Yoon |
| 2015/0127983 A1 | 5/2015 | Trobough et al. |
| 2015/0143017 A1* | 5/2015 | Brontvein ........... G06F 13/4022 710/316 |

* cited by examiner

OPERATION METHOD OF STORAGE DEVICE, OPERATION METHOD OF HOST DEVICE, AND OPERATION METHOD OF USER SYSTEM INCLUDING STORAGE DEVICE AND HOST DEVICE

CROSS-REFERENCE TO RELATED APPLICATIONS

A claim for priority under 35 U.S.C. § 119 is made to Korean Patent Application No. 10-2015-0092376 filed Jun. 29, 2015, in the Korean Intellectual Property Office, the entire contents of which are hereby incorporated by reference.

BACKGROUND

Embodiments of the inventive concept relate to a storage device, and more particular, to an operation method of a storage device, an operation method of a host device, and an operation method of a user system including the storage device and the host device.

A storage medium is connected with another electronic device to transmit data or store received data. The storage medium exchanges data with any other electronic device using an interface technology. Various interface protocols are being defined according to an increase in kinds of storage media or electronic devices.

A universal flash storage (UFS) interface is proposed, for example. The UFS is configured to have a multi-layer structure. In particular, the UFS uses the interface protocol called a unified protocol (Unipro). Unipro indicates a link layer which is proposed by the mobile industry processor interface (MIPI) alliance to unify an interfacing procedure of a mobile device. Unipro supports a physical layer called "PHY". An electronic device which performs interfacing using Unipro and PHY layer includes a transmitter and a receiver which are used to exchange data with any other electronic device.

The performance of the storage media is improved as the communication technology or semiconductor technology advances. Thus, an operating speed of the storage media may be improved, and firmware is implemented such that the storage media includes a variety of functions. An increase in the operating speed or the various functions may cause a frequent error of the storage media. A debugging technique for extracting error information is required to detect or correct such an error. For example, in the case where an error occurs, a host connected to the UFS is reset, thereby making it difficult for a manufacturer or a developer to check an error situation.

SUMMARY

Embodiments of the inventive concept provide an operation method of a storage device, an operation method of a host device, and an operation method of a user system including the host device and the server device, capable of extracting an error log based on communication of a lower layer when an upper layer does not operate normally in the user system with a multi-layer structure.

Example embodiments of the inventive concept are directed to an operation method of a storage device that includes a storing unit storing a plurality of error logs and a physical layer, and exchanges an electrical signal with a host via the physical layer. The operation method may include receiving a debugging command from the host, setting a first value at a first attribute included in the physical layer in response to the debugging command, setting a second value different from the first value at the first attribute in response to a control of the host, setting one among the plurality of error logs at a second attribute based on the first attribute at which the second value is set, and transmitting the error log set at the second attribute to the host in response to a control of the host.

Example embodiments of the inventive concept are directed to an operation method of a user system that includes a host device including a first physical layer and a storage device including a second physical layer. The operation method may include getting a first value from a first attribute included in the second physical layer of the storage device, through the host, transmitting a debugging command to the storage device, through the host, setting a second value at the first attribute in response to the debugging command, through the storage device, determining whether the first attribute is the second value and resetting the first attribute with the first value when the first attribute is the second value, through the host, determining whether the first attribute is the first value, setting an error log, which is to be extracted, at a second attribute included in the second physical layer when the first attribute is the first value, and setting the second value at the first attribute, through the storage device, and determining whether the first attribute is the second value and getting the to-be-extracted error log from the second attribute when the first attribute is the second value. The first physical layer of the host device and the second physical layer of the storage device may communicate with each other based on a peer to peer (P2P) communication.

Example embodiments of the inventive concept are directed to an operation method of a host device that includes a first physical layer and exchanges an electrical signal with a storage device via the first physical layer. The operation method may include transmitting a debugging command to the storage device, getting a first value from a first attribute included in a second physical layer of the storage device, setting a second value at the first attribute to then determine whether the first attribute is the first value, and getting an error log from a second attribute included in the second physical layer when the first attribute is the first value.

BRIEF DESCRIPTION OF THE FIGURES

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION

Exemplary embodiments of the inventive concept will now describe the scope of the invention in detail to clearly convey the scope of the invention to those skilled in the art. In the following description, detailed information about detailed components and structures may be provided for understanding of embodiments of the inventive concept. Therefore, modifications or changes about embodiments disclosed herein may be made without departing from the scope and spirit of the inventive concept. Furthermore, descriptions about well-known functions and structures may be omitted for clarity and conciseness. Terms disclosed herein may be defined in the light of functions of the inventive concept, not limited to a specific function. Terms may be defined based on information disclosed in the detailed description.

In the following drawings and the detailed description, modules may be illustrated in drawings and described in the detailed description as being connected to other components. Connection among modules or components may be directly or indirectly connected. Connections among modules or components may be communication connections and/or may be physical connections.

In this specification, components which are described with reference to terms "unit", "module", "layer", and the like may be implemented with software, hardware, or a combination thereof. In exemplary embodiments, software may be firmware, embedded code, and application software.

For example, hardware may include a circuit, a processor, a computer, an integrated circuit, integrated circuit cores, a pressure sensor, an inertial sensor, microelectromechanical system (MEMS), a passive element, or a combination thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Below, for descriptive convenience, the inventive concept will be descried using specific embodiments. However, the scope and spirit of the inventive concept may not be limited thereto. For example, various embodiments may be implemented independently, or various embodiments may be combined.

Figure 1:
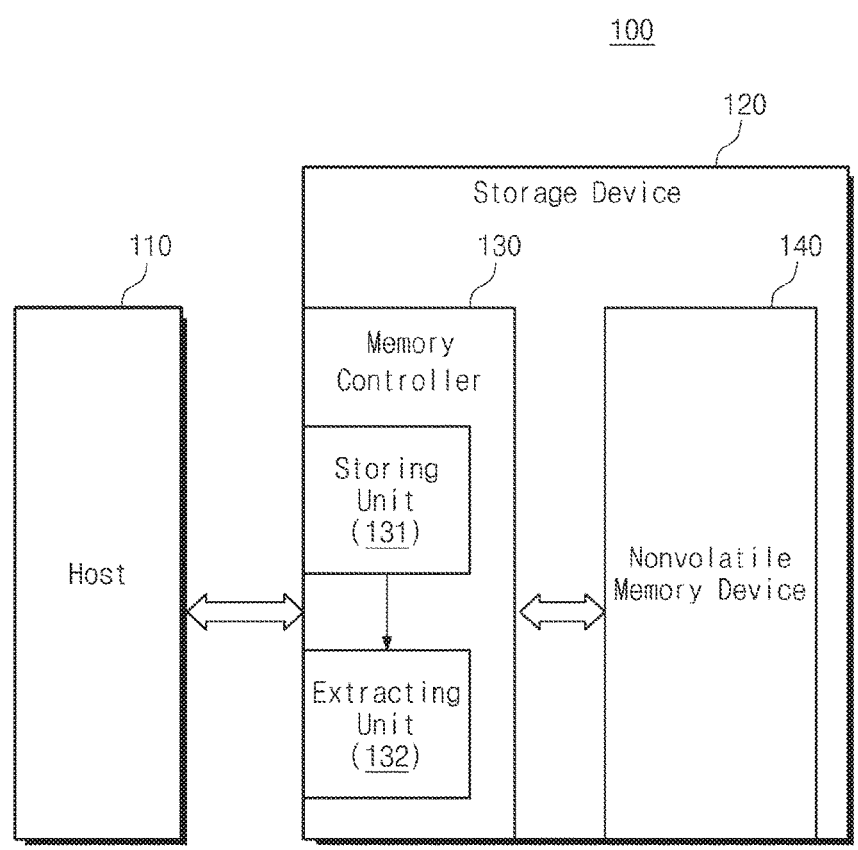
FIG. 1 is a block diagram schematically illustrating a user system according to an exemplary embodiment of the inventive concept.

FIG. 1 is a block diagram schematically illustrating a user system according to an exemplary embodiment of the inventive concept. Referring to FIG. 1, a user system 100 may include a host 110 and a storage device 120. In exemplary embodiments, the user system 100 may include, for example, a computer, a portable computer, a ultra-mobile PC (UMPC), a workstation, a server computer, a net-book, a personal digital assistant (PDA), a web tablet, a wireless phone, a mobile phone, a smartphone, a digital camera, a digital audio recorder, a digital audio player, a digital picture recorder, a digital picture player, a digital video recorder, a digital video player, a device capable of transmitting and receiving information at a wireless environment, or one of various electronic devices constituting a home network.

The host 110 may perform various operations needed to operate the user system 100. For example, the host 110 may drive an operating system (OS) and may run a variety of application programs on the OS. The host 110 may read and write data from and in the storage device 120. In exemplary embodiments, the host 110 may be a central processing unit (CPU), an application processor (AP), or the like. Alternatively, the host 110 may be a separate debugging device.

The host 110 may communicate with the storage device 120 through a predefined interface. For example, the host 110 may communicate with the storage device 120 based on a UFS interface. However, the scope and spirit of the inventive concept may not be limited thereto. For example, communication between the host 110 and the storage device 120 may be performed based on at least one of various communication protocols such as double data rate (DDR), DDR2, DDR3, DDR4, low power DDR (LPDDR), universal serial bus (USB), multimedia card (MMC), embedded MMC, peripheral component interconnection (PCI), PCI-express (PIC-E), advanced technology attachment (ATA), serial ATA, parallel ATA, small computer small interface (SCSI), enhanced small disk interface (ESDI), integrated drive electronics (IDE), Firewire, nonvolatile memory express (NVMe), and the like.

The storage device 120 may include a memory controller 130 and a nonvolatile memory device 140. Under control of the host 110, the memory controller 130 may write or read data in or from the nonvolatile memory device 140.

Under control of the memory controller 130, the nonvolatile memory device 140 may write data therein or may output written data. In exemplary embodiments, the nonvolatile memory device 140 may be implemented with various nonvolatile memory elements such as electrically erasable and programmable ROM (EEPROM), NAND flash memory, NOR flash memory, phase-change RAM (PRAM), resistive RAM (ReRAM), ferroelectric RAM (FRAM), spin-torque magnetic RAM (STT-MRAM), and the like. For descriptive convenience, it is assumed that the nonvolatile memory device 140 may include a NAND flash memory. In exemplary embodiments, the nonvolatile memory device 140 may include a plurality of dies, a plurality of chips, or a plurality of packages and may be connected with the memory controller 130 through a plurality of channels.

In an embodiment of the inventive concept, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In an embodiment of the inventive concept, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

In exemplary embodiments, an error may occur while the storage device 120 operates in response to control of the host 110. For example, an error may arise from firmware, driven on the storage device 120, or hardware. In this case, a debugging operation may be independently performed to extract information (i.e., an error log) about an error arising from the storage device 120.

The memory controller 130 of the storage device 120 according to an exemplary embodiment of the inventive concept may include a storing unit 131 and an extracting unit 132. The storing unit 131 may be configured to store an error log (or a debugging log) when an error occurs while the storage device 120 is operating. For example, in the case where an error occurs while the storage device 120 is operating, the memory controller 130 may store an error log about the error in the storing unit 131. In exemplary embodiments, the storing unit 131 may be a static RAM (SRAM).

The extracting unit 132 may provide the host 110 with the error log stored in the storing unit 131 in response to control of the host 110. In exemplary embodiments, the extracting unit 132 may selectively provide the host 110 with the error log stored in the storing unit 131. In exemplary embodiments, the extracting unit 132 may provide the host 110 with the error log stored in the storing unit 131 through a repetitive operation.

In exemplary embodiments, the storage device 120 may be based on a multi-layer structure. That is, the storage device 120 may be implemented to include a plurality of layers. In exemplary embodiments, the extracting unit 132 of the memory controller 130 may be included in a lower layer (or the lowest layer) of the plurality of layers. In exemplary embodiments, the lower layer may indicate a physical layer, which is used to exchange an electrical signal directly with the host 110, from among the plurality of layers. That is, even though an upper layer of the plurality of layers does not operate normally due to an error of the storage device 120, the host 110 may extract an error log normally through the extracting unit 132, thereby improving the reliability of the storage device 120.

Figure 2:
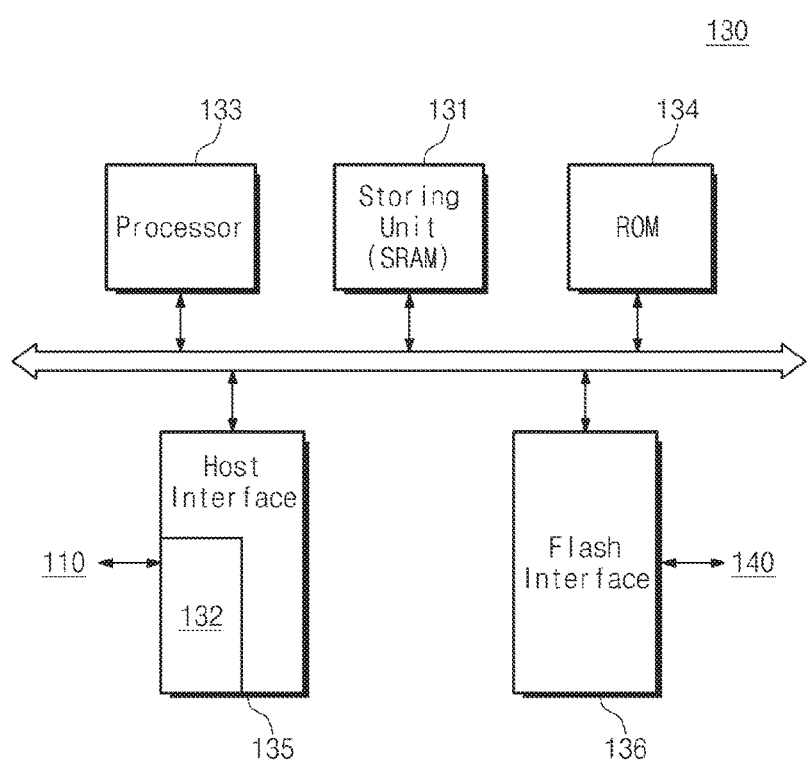
FIG. 2 is a block diagram schematically illustrating a memory controller of FIG. 1.

FIG. 2 is a block diagram schematically illustrating a memory controller of FIG. 1. Referring to FIGS. 1 and 2, the memory controller 130 may include the storing unit 131, a processor 133, a ROM 134, a host interface 135, and a flash interface 136.

As described with reference to FIG. 1, the storing unit 131 may store an error log which is generated from the storage device 120. The storing unit 131 may be an SRAM and may be used as a buffer memory, a cache memory, and a working memory of the memory controller 130.

The processor 133 may control an overall operation of the memory controller 130. The ROM 134 may store a variety of information, needed to operate the memory controller 134, in the form of firmware. In exemplary embodiments, firmware stored in the ROM 134 may be driven by the processor 133. Alternatively, the processor 133 may write error information in the storing unit 131 or may manage error information stored in the storing unit 131.

The memory controller 130 may communicate with the host 110 through the host interface 135. In exemplary embodiments, the host interface 135 may include the extracting unit 132. Since the extracting unit 132 is described with reference to FIG. 1, a detailed description thereof may be thus omitted. The memory controller 130 may communicate with the nonvolatile memory device 140 through the flash interface 136.

Figure 3:
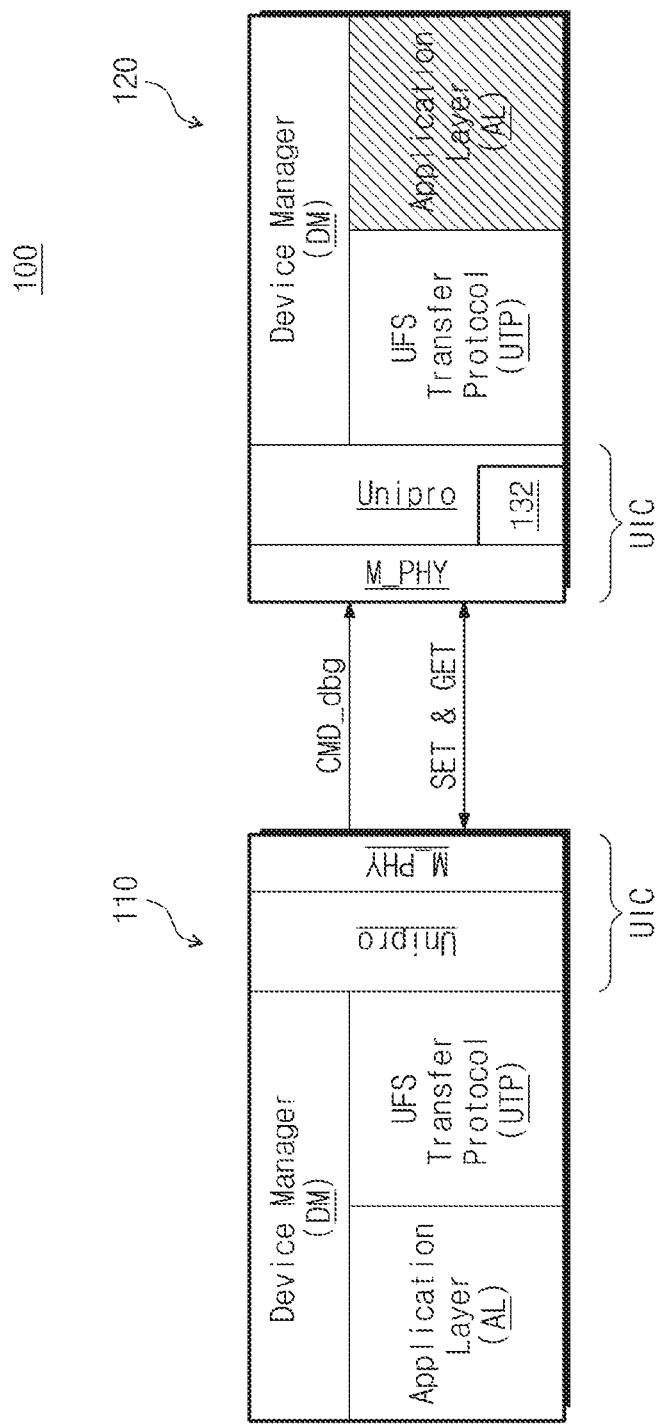
FIG. 3 is a diagram schematically illustrating a multi-layer structure of a user system of FIG. 1.

FIG. 3 is a diagram schematically illustrating a multi-layer structure of a user system of FIG. 1. A layer structure of the UFS will be exemplarily described with reference to FIG. 3. However, the scope and spirit of the inventive concept may not be limited thereto. For example, the scope and spirit of the inventive concept may be applied to a user system with a multi-layer structure.

For convenience of illustration and description, components which are not needed for a debugging operation (or an error log extracting operation) according to an exemplary embodiment of the inventive concept or duplicated components may be omitted. Each layer illustrated in FIG. 3 may be a hardware layer or a software layer. The terms disclosed herein may be used to describe embodiments of the inventive concept, not limiting the scope and spirit of the inventive concept.

Referring to FIGS. 1 to 3, the user system 100 may include the host 110 and the storage device 120. Each of the host 110 and the storage device 120 may include a UFS interconnection layer (hereinafter referred to as "UIC"), a UFS transport protocol layer (hereinafter referred to as "UTP"), an application layer (hereinafter referred to as "AL"), and a device manager (hereinafter referred to as "DM").

For descriptive convenience, each layer of the storage device 120 will be described, but the claims of the inventive concept may not be limited thereto. Operations of layers of the host 110 may be similar to those of corresponding layers of the storage device 120.

The UIC of the storage device 120 may be the lowest layer of the storage device 120 for managing communication between the storage device 120 and the host 110. The UIC may be implemented with a physical layer and may include Unipro and M-PHY. The Unipro and M-PHY may be the interface protocol that the MIPI alliance proposes.

The UIC of the storage device 120 may convert information received from an upper layer (i.e., the UTP) so as to be suitable for a predefined protocol (e.g., M-PHY protocol) and may transmit the converted result to the host 110. The UIC of the storage device 120 may provide information received from the host 110 to an upper layer (i.e., the UTP).

The UTP may provide services for the AL. For example, the UTP may create a data packet (i.e., a UFS protocol information unit (UPIU)) for transmission and reception of data or requests or may release a received data packet. The AL may drive a variety of firmware needed to operate the storage device 120. In exemplary embodiments, the AL may include a command set layer (hereinafter referred to as "UCS"), and the UCS may manage commands such as reading, writing, and the like. The DM may be configured to control each layer of the storage device 120. In exemplary embodiments, the DM may be configured to control and manage various operating mode level operations and configurations.

In exemplary embodiments, the UTP and the AL may be stored in the storing unit 131 in the form of firmware and may be driven by the processor 133. The processor 133 may write an error log in the storing unit 131 when an error occurs while driving the UTP and the AL.

In exemplary embodiments, the UIC of the host 110 and the UIC of the storage device 120 may support peer to peer (P2P) communication. For example, the Unipro of the UIC may include a device management entity (DME) (not shown). The Unipro of the host 110 or the storage device 120 may provide an access to the DME to control an operation or an attribute. In other words, communication between the UIC of the host 110 and the UIC of the storage device 120 may be performed independently of other layers.

As a detailed example, the Unipro of the UIC may include a plurality of attributes. In exemplary embodiments, an attribute may be data or bits indicating specific information and may be stored in a separate storage space such as a register, a storage circuit, or the like. In exemplary embodiments, the attribute may indicate an atomic unit of information which is set or obtained using service primitives (e.g., DME_SET, DME_GET, DME_PEER_GET, DME_PEER_SET, and the like). In exemplary embodiments, the service primitives may be used for communication between UICs (in detail, Unipros) of the host 110 and the storage device 120.

In exemplary embodiments, the UIC of the host 110 may read or set attributes included in the Unipro of the UIC of the storage device 120. That is, even though upper layers such as the UTP, the AL, and the DM do not operate normally due to a specific error, as lower layers, the UIC of the host 110 and the UIC of the storage device 120 may communicate with each other and may set or obtain a plurality of attributes. For example, as illustrated in FIG. 3, in the case where an error arises from the AL of the storage device 120, communication between the host 110 and the storage device 120 may not be performed normally. In this case, an error log about the AL may be stored in the storing unit 131. The host 110 may normally perform the P2P communication with the UTP and the UIC lower than the AL.

In exemplary embodiments, the UIC of the storage device 120 may include the extracting unit 132. In the case where upper layers such as the UTP, the AL, and the DM do not operate normally due to an error of the storage device 120, the host 110 may extract an error log through the P2P communication of the UIC. As will be described in detail below, the extracting unit 132 may include first and second attributes. The extracting unit 132 may set the first and second attributes under control of the host 110. The host 110 may obtain the first and second attributes thus set, thereby extracting the error log.

In exemplary embodiments, the AL of the host 110 may include a device driver, and the device driver may control each layer included in the host 110.

Figure 4:
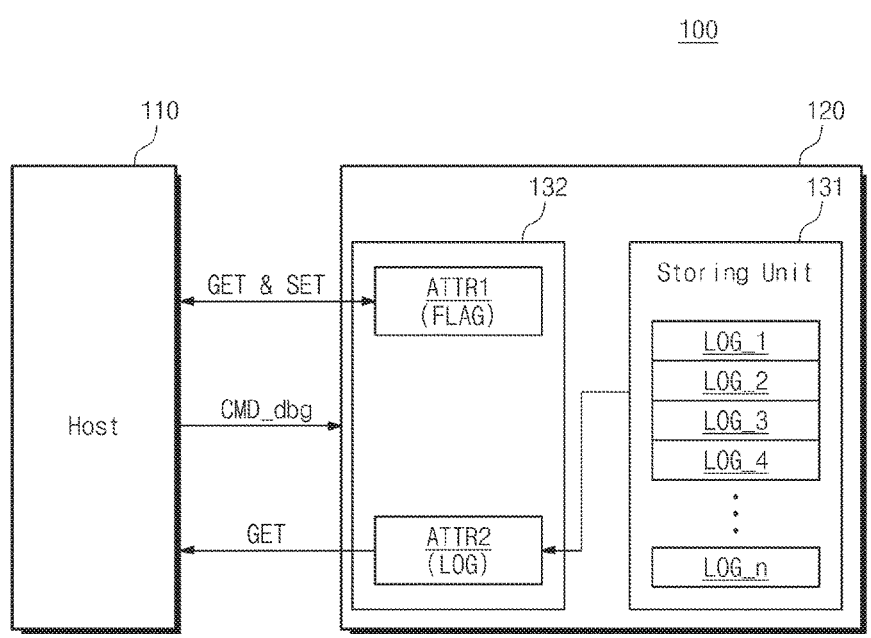
FIG. 4 is a block diagram for describing a debugging operation (or an error log extracting operation) of a user system of FIG. 1.

FIG. 4 is a block diagram for describing a debugging operation (or an error log extracting operation) of a user system of FIG. 1. Below, for descriptive convenience, components which are not needed for an error log extracting operation may be omitted. Unless otherwise defined, each of first and second attributes ATTR1 and ATTR2 may be assumed as indicating a separate storage circuit for storing information of the above-described atomic unit. Furthermore, it may be assumed that the first attribute ATTR1 stores a flag and the second attribute ATTR2 stores an error log.

Furthermore, the first and second attributes ATTR1 and ATTR2 may be included in the UIC of the storage device 120 described with reference to FIG. 3, and the host 110 or the storage device 120 may read or set the first and second attributes ATTR1 and ATTR2 using the service primitives (e.g., DME_PEER_SET, DME_PEER_GET, and the like). However, the scope and spirit of the inventive concept may not be limited thereto.

Referring to FIG. 4, the user system 100 may include the host 110 and the storage device 120. The storage device 120 may include the storing unit 131 and the extracting unit 132. In exemplary embodiments, for ease of illustration, the memory controller 130 and the nonvolatile memory device 140 of the storage device 120 may be omitted.

The storing unit 131 may include a plurality of error logs LOG_1 to LOG_n. Each of the plurality of error logs LOG_1 to LOG_n may include information about an error occurring while the storage device 120 is operating. In exemplary embodiments, each of the plurality of error logs LOG_1 to LOG_n may include error information about each layer described with reference to FIG. 3. Alternatively, each of the plurality of error logs LOG_1 to LOG_n may include error information about a variety of hardware included in the storage device 120. Alternatively, each of the plurality of error logs LOG_1 to LOG_n may include error information about each of various modules included in the storage device 120.

The extracting unit 132 may include the first and second attributes ATTR1 and ATTR2. As described with reference to FIG. 3, the first and second attributes ATTR1 and ATTR2 of the extracting unit 132 may be included in the Unipro of the UIC, and the first and second attributes ATTR1 and ATTR2 may be set or got according to control of the UIC of the host 110 or the storage device 120.

As a detailed example, the first attribute ATTR1 may be an area for storing the flag indicating setting of the error log. The first attribute ATTR1 may be set or got by the UIC of the host 110 or the storage device 120. The second attribute ATTR2 may be an area for storing the error log. The second attribute ATTR2 may be got by the UIC of the host 110 and may be set by the UIC of the storage device 120.

The storage device 120 may receive a debugging command CMD_dgb from the host 110 and may perform an error log extracting operation in response to the debugging command CMD_dgb. For example, the storage device 120 may set the flag of the first attribute ATTR1 in response to the debugging command CMD_dgb. Afterwards, the host 110 may control the storage device 120 in response to the flag of the first attribute ATTR1 such that the error logs LOG_1 to LOG_n stored in the storing unit 131 are extracted. The error log extracting operation (i.e., a debugging operation) will be described in detail with reference to accompanying drawings.

In exemplary embodiments, the debugging command CMD_dbg may be a command for generating an interrupt of the storage device 120. In exemplary embodiments, the debugging command CMD_dbg may be a vendor command, a reserved command, or a combination of specific commands. In exemplary embodiments, the debugging command CMD_dbg may be a SCSI command a UFS dedicated command which is discriminated by the AL. The debugging command CMD_dbg may be a command discriminated by the UTP. Alternatively, the debugging command CMD_dbg may be a command discriminated by the UIC. Alternatively, the debugging command CMD_dbg may include a bit combination, an identification code, or a device ID discriminated by the UIC.

In exemplary embodiments, an operation of the host 110 according to an exemplary embodiment of the inventive concept may be executed by a device driver included in the host 110. For example, the UICs of the host 110 and the storage device 120 may communicate with each other under control of the device driver included in the host 110.

Figure 5:
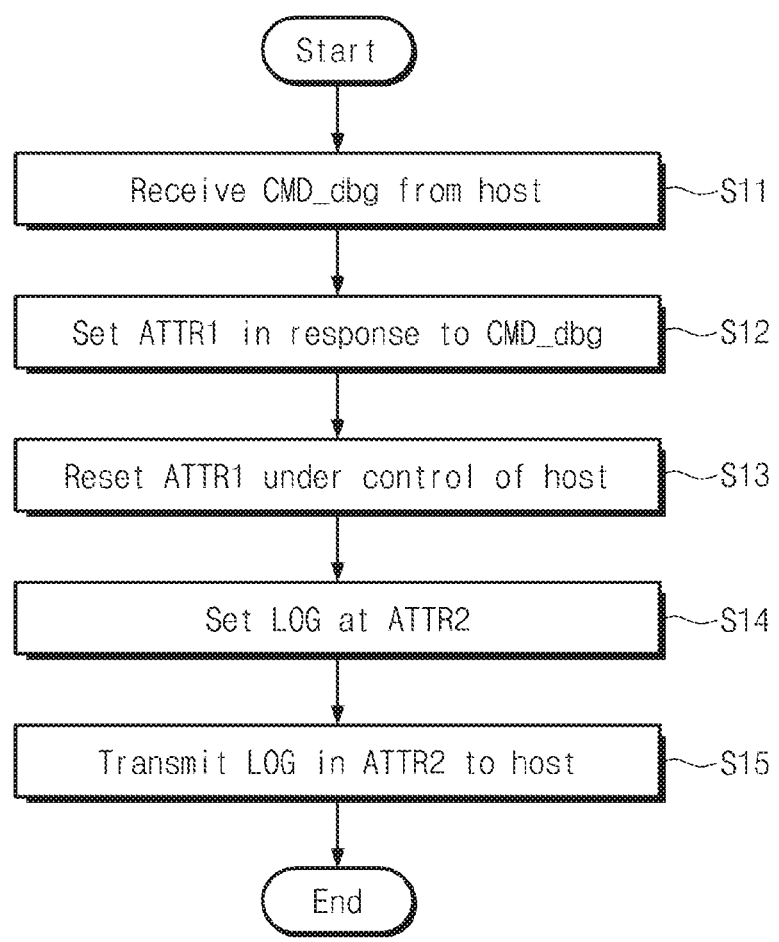
FIG. 5 is a flow chart schematically illustrating an operation of a storage device of FIG. 4.

FIG. 5 is a flow chart schematically illustrating an operation of a storage device of FIG. 4. Referring to FIGS. 4 and 5, in step S11, the storage device 120 may receive a debugging command CMD_dbg from the host 110.

In step S12, the storage device 120 may set the first ATTR1 in response to the debugging command CMD_dbg. For example, the storage device 120 may set a value of the first attribute ATTR1 among a plurality of attributes included in the UIC in response to the debugging command CMD_dbg. At this time, the first attribute ATTR1 may be an area for storing the flag for transmission and reception of the error log. In exemplary embodiments, the storage device 120 may set the first attribute ATTR1 using the set service primitive (e.g., DME_SET).

In step S13, the storage device 120 may reset the first attribute ATTR1 in response to control of the host 110. For example, the storage device 120 may reset the first attribute ATTR1 based on the set service primitive (e.g., DME_PEER_SET) from the host 110. In exemplary embodiments, a value of the first attribute ATTR1 thus reset may be an inverted value compared to a value of the first attribute ATTR1 set in step S12.

In step S14, the storage device 120 may set an error log at the second attribute ATTR2 in response to the reset first attribute ATTR1. For example, the storing unit 131 included in the storage device 120 may include a plurality of error logs LOG_1 to LOG_n. The storage device 120 may set a part of the plurality of error logs LOG_1 to LOG_n at the second attribute ATTR2. In exemplary embodiments, the second attribute ATTR2 may have a predetermined size. In the case where a size of each of the plurality of error logs LOG_1 to LOG_n is the same as that of the second attribute ATTR2, one of the plurality of error logs LOG_1 to LOG_n may be set at the second attribute ATTR2; in the case where a size of each of the plurality of error logs LOG_1 to LOG_n is greater than that of the second attribute ATTR2, a part of one of the plurality of error logs LOG_1 to LOG_n may be set at the second attribute ATTR2.

In step S15, the storage device 120 may transmit an error log set at the second attribute ATTR2 to the host 110. For example, the storage device 120 may transmit an error log set at the second attribute ATTR2 to the host 110 in response to control of the host 110. At this time, the host 110 may obtain the error log set at the second attribute ATTR2 using the get service primitive (e.g., DME_PEER_GET).

In exemplary embodiments, a size of the second attribute ATTR2 may be a predetermined size. For example, as described above, the attribute ATTR may be an atomic unit of information set or got by the service primitive. In this case, the size of the second attribute ATTR2 may be smaller than that of an error log. The storage device 120 may repetitively perform the above-described error log extracting operation to transmit the error log stored in the storing unit 131 to the host 110.

Figure 6:
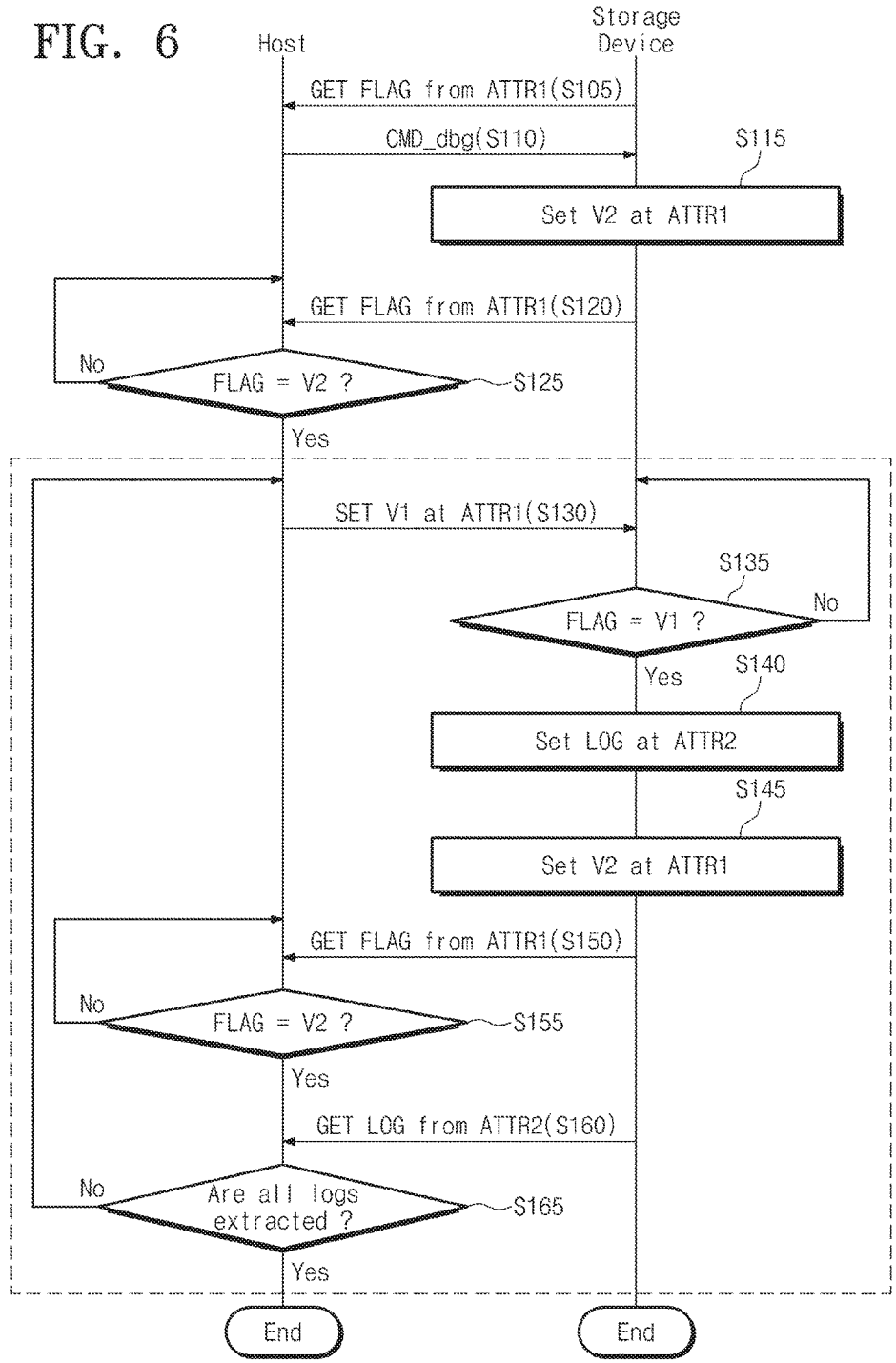
FIG. 6 is a flow chart for describing in more detail an operation of a user system of FIG. 4.

FIG. 6 is a flow chart for in more detail describing an operation of a user system of FIG. 4. Referring to FIGS. 4 and 6, in step S105, the host 110 may get a flag from the first attribute ATTR1 of the storage device 120. For example, the first attribute ATTR1 of the storage device 120 may be an area for storing the flag. The host 110 may get or read the flag of the first attribute ATTR1 using the get service primitive (e.g., DME_PEER_GET). For descriptive convenience, it may be assumed that a flag obtained in step S105 is a first value V1.

In step S110, the host 110 may transmit a debugging command CMD_dbg to the storage device 120. For example, the host 110 may issue the debugging command CMD_dbg to the storage device 120 to extract error logs of the storage device 120.

In step S115, the storage device 120 may set a second value V2 at the flag of the first attribute ATTR1. In exemplary embodiments, the second value V2 may be an inverted version of the first value V1.

In step S120, the host 110 may get the flag from the first attribute ATTR1. For example, similarly to step S105, the host 110 may get the flag from the first attribute ATTR1.

In step S125, the host 110 may determine whether the flag obtained in step S120 is the second value V2. If the flag is not the second value V2, the method may proceed to step S120. In exemplary embodiments, the host 110 may perform operations of steps S120 and S125 repetitively. That is, steps S120 and S125 may indicate a polling operation of the host 110 about the flag.

If the flag is the second value V2, in step S130, the host 110 may set the first value V1 at the first attribute ATTR1. For example, the host 110 may set the first value V1 at the first attribute ATTR1 using the set service primitive (e.g., DME_PEER_SET).

In step S135, the storage device 120 may determine whether the flag of the first attribute ATTR1 is the first value V1. For example, the storage device 120 may read the first attribute ATTR1 using the get service primitive (e.g., DME_GET). The storage device 120 may determine whether a value of the first attribute ATTR1 thus read is the first value V1. In exemplary embodiments, an operation of step S135 may indicate a polling operation of the storage device 120 about the first attribute ATTR1.

In the case where the flag of the first attribute ATTR1 is the first value V1, in step S140, the storage device 120 may set an error log at the second attribute ATTR2. In exemplary embodiments, the second attribute ATTR2 may indicate a predetermined storage unit (i.e., a specific register area or a specific storage area) to store the error log. The storage device 120 may set or store one of a plurality of error logs LOG_1 to LOG_n stored in the storing unit 131 to or in the second attribute ATTR2.

In exemplary embodiments, a size of each of the plurality of error logs LOG_1 to LOG_n may be managed to be the same as a size of the second attribute ATTR2. Alternatively, a size of each of the plurality of error logs LOG_1 to LOG_n may be managed to be greater than a size of the second attribute ATTR2. At this time, the storage device 120 may store or set a part of one of the plurality of error logs LOG_1 to LOG_n in or at the second attribute ATTR2.

In exemplary embodiments, setting of the error log (S140) may be performed by the DME of the Unipro in the storage device 120 described with reference to FIG. 3. That is, the storage device 120 may store or set the error log in or at the second attribute ATTR2 using the set service primitive (e.g., DME_SET).

In step S145, the storage device 120 may set the second value at the flag of the first attribute ATTR1. For example, the storage device 120 may set the error log at the second attribute ATTR2 and then may set the second value V2 at the first attribute ATTR1 using the set service primitive (e.g., DME_SET).

In step S150, the host 110 may get the flag of the first attribute ATTR1. For example, the host 110 may get the flag of the first attribute ATTR1 in a manner similar to step S105.

In step S155, the host 110 may determine whether the flag obtained in step S150 is the second value V2. In the case where the flag is not the second value V2, the method may proceed to step S150. In exemplary embodiments, operations of steps S150 and S155 may be a polling operation of the host 110 about the first attribute ATTR1 and may be performed periodically.

In exemplary embodiments, that the second value V2 is set at the first attribute ATTR1 through operations of steps S140 and S145 may indicate that the error log is set at the second attribute ATTR2 (or the second attribute ATTR2 is updated with the error log). That is, in the case where the flag is the second value V2, in step S160, the storage device 120 may get the set error log from the second attribute ATTR2. In exemplary embodiments, the host 110 may get the error log using the get service primitive (e.g., DME_PEER_GET).

In step S165, the host 110 may determine whether all error logs are extracted. In the case where at least one of the error logs is not extracted, the host 110 and the storage device 120 may repetitively perform operations of steps S130 and S140. For example, in the case where the second attribute ATTR2 has a size of four bytes, the host 110 may perform a set of operations of steps S130 to S160 once and may extract a 4-byte error log. At this time, the whole size of the plurality of error logs LOG_1 to LOG_n stored in the storing unit 131 is 128 KB, the host 110 may perform a set of operations of steps S130 to S160 repetitively and may extract error logs of 128 KB.

In exemplary embodiments, at an error log extracting operation (or a debugging operation), a firstly extracted error log may include size information about the plurality of error logs LOG_1 to LOG_n stored in the storing unit 131. The host 110 may set a repetition count about operations of steps S130 to S160 based on the size information.

In exemplary embodiments, after the plurality of error logs LOG_1 to LOG_n all is sent to the host 110, the storage device 120 may send a response to the debugging command CMD_dbg to the host 110. In exemplary embodiments, in the case where the set service primitive (e.g., DME_PEER_SET) is not performed during a specific time (i.e., in the case where step S130 is not performed during the specific time), the storage device 120 may send a check condition to the host 110.

According to an exemplary embodiment of the inventive concept, the host 110 may perform communication with the storage device 120 based on the UIC being a lower layer and may extract error information. That is, even though an upper layer (e.g., the UTP, the AL, the DM, and the like) does not normally operate due to an error thereof, the host 110 may extract error information from the storage device 120 through the UIC being a lower layer, thereby improving the reliability of the user system.

Figure 7:
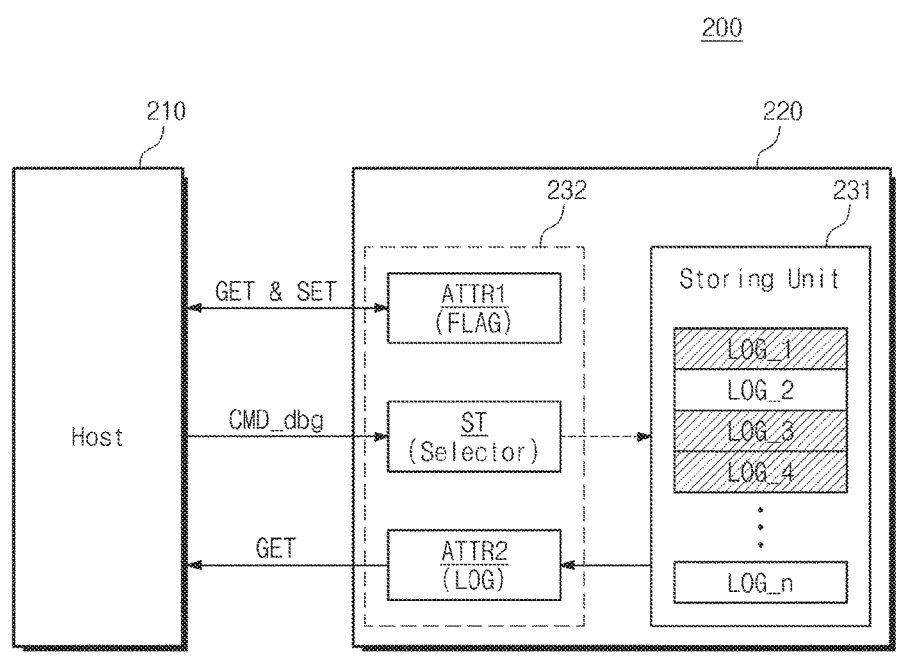
FIG. 7 is a block diagram schematically illustrating a user system according to another exemplary embodiment of the inventive concept.

FIG. 7 is a block diagram schematically illustrating a user system according to another exemplary embodiment of the inventive concept. For descriptive convenience, components which are not needed for an error log extracting operation may be omitted, and a detailed description about the above-described components may be also omitted.

Unless otherwise defined, each of the first and second attributes ATTR1 and ATTR2 may be assumed as indicating a separate storage circuit or a separate storage area for storing information of the above-described atomic unit. Furthermore, it may be assumed that the first attribute ATTR1 is an area for storing a flag and the second attribute ATTR2 is an area for storing an error log.

Furthermore, the first and second attributes ATTR1 and ATTR2 may be included in the UIC of the storage device 220 as described with reference to FIG. 3, and the host 210 or the storage device 220 may read or set the first and second attributes ATTR1 and ATTR2 using the service primitives (e.g., DME_PEER_SET, DME_PEER_GET, and the like). However, the scope and spirit of the inventive concept may not be limited thereto.

Referring to FIG. 7, a user system 200 may include a host 210 and a storage device 220. The storage device 220 may include a storing unit 231 and an extracting unit 232. In exemplary embodiments, as described above, the storing unit 231 and the extracting unit 232 may be included in a memory controller (not shown) included in the storage device 220.

The extracting unit 232 may be included in the UIC of the storage device 220 as described with reference to FIG. 3. The extracting unit 232 may include first and second attributes ATTR1 and ATTR2. The first attribute ATTR1 may be an area for storing the flag, and the second attribute ATTR2 may be an area for storing an error log (in detail, an error log to be extracted).

A selector ST may select an error log, which is to be extracted, from among a plurality of error logs LOG_1 to LOG_n stored in the storing unit 232, based on a debugging command CMD_dbg received from the host 210. For example, the debugging command CMD_dbg may include information about an error log to be extracted. The selector ST may select an error log, which is to be extracted, from among the plurality of error logs LOG_1 to LOG_n, based on information about a to-be-extracted error log included in the debugging command CMD_dbg. The error log selected by the selector ST may be sequentially set at the second attribute ATTR2. In exemplary embodiments, the selector ST may be implemented in the form of software and may be driven by a processor (refer to FIG. 2). Alternatively, the selector ST may be implemented in the form of hardware.

Figure 8:
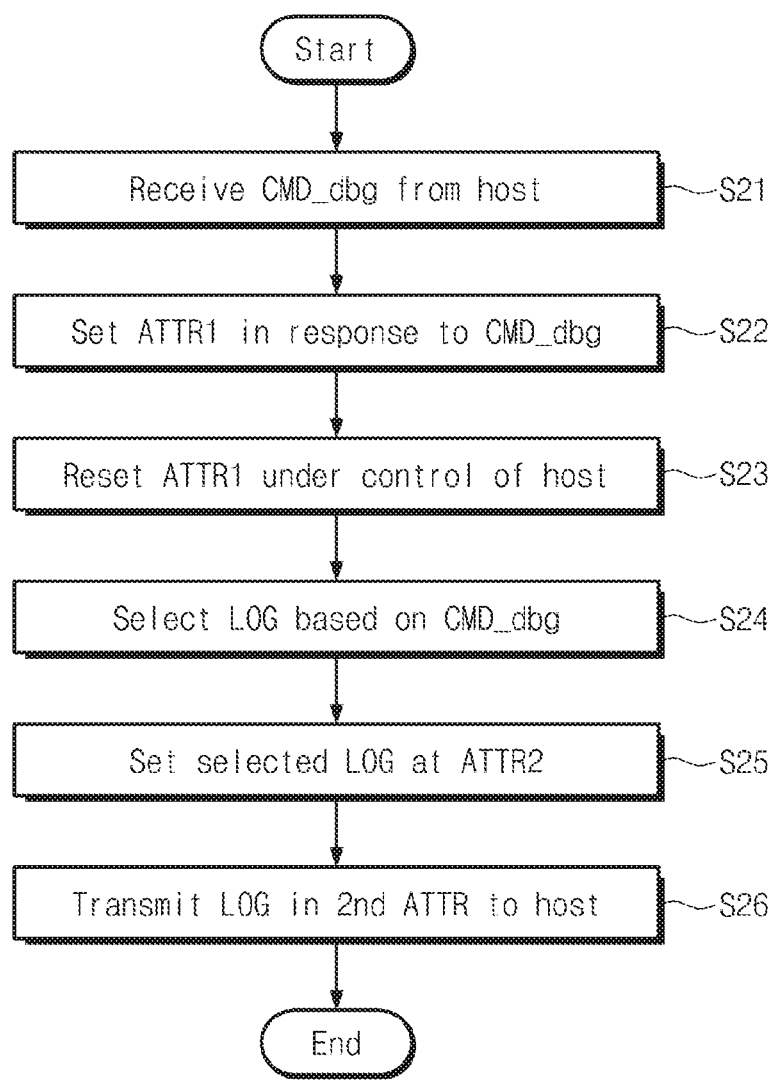
FIG. 8 is a flow chart schematically illustrating an operation of a storage device of FIG. 7.

FIG. 8 is a flow chart schematically illustrating an operation of a storage device of FIG. 7. Referring to FIGS. 7 and 8, the storage device 220 may perform operations of steps S21 to S23. Operations of steps S21 to S23 may be similar to those of steps S11 to S13 of FIG. 5, and a detailed description thereof may be thus omitted.

In step S24, the storage device 220 may select an error log based on a received debugging command CMD_dbg. For example, the storing unit 231 may include a plurality of error logs LOG_1 to LOG_n. Each of the plurality of error logs LOG_1 to LOG_n may include error information about each of various layers, a variety of hardware, and various modules. As a detailed example, the debugging command CMD_ dbg may include information about an error log to be extracted. The server device 120 may select an error log, corresponding to a specific layer, specific hardware, or a specific module, from among the plurality of error logs LOG_1 to LOG_n based on information about a to-be-extracted error log included in the debugging command CMD_dbg.

In step S25, the storage device 220 may set a selected error log at the second attribute ATTR2. In step S26, the storage device 220 may transmit the error log of the second attribute ATTR2 to the host 210.

In exemplary embodiments, at an error log extracting operation described with reference to FIGS. 4 to 6, the host 110 may extract all error logs included in the storing unit 131. In contrast, in an embodiment of FIG. 7, an extracted error log may be selected based on a debugging command CMD_dbg, and the selected error log may be extracted. That is, a time taken to extract an error log is reduced, and thus a user system with improved performance and reliability may be provided.

Figure 9:
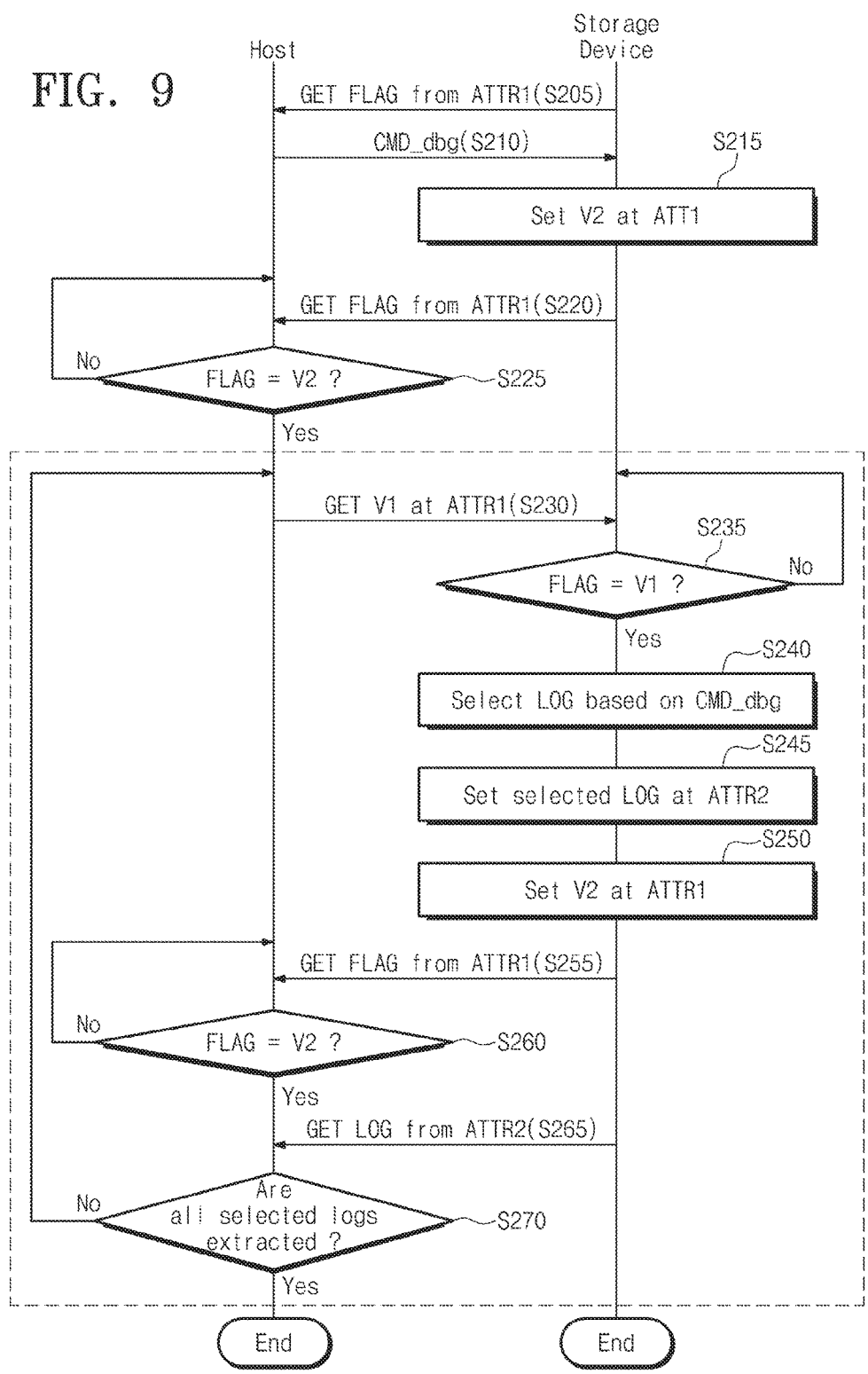
FIG. 9 is a flow chart illustrating a detailed operation of a user system of FIG. 7.

FIG. 9 is a flow chart illustrating a detailed operation of a user system of FIG. 7. Referring to FIGS. 7 and 9, each of the host 210 and the storage device 220 may perform operations of steps S205 to 235. The operations of steps S205 to 235 may be similar to those of steps S105 to S135 of FIG. 6, and a detailed description thereof may be thus omitted.

In step S240, the storage device 220 may select an error log based on a received debugging command CMD_dbg. For example, as described with reference to FIG. 7, the received debugging command may include information about an error log to be extracted. The selector ST of the storage device 220 may select one, which is to be extracted, from among a plurality of error logs LOG_1 to LOG_n based on information about the error log to be extracted. In exemplary embodiments, the error log to be extracted may be an error log associated with a specific layer, specific hardware, or a specific module.

In step S245, the storage device 220 may set the selected error log at the second attribute ATTR2. In exemplary embodiments, the storage device 220 may set a part of the selected error log at the second attribute ATTR2.

The host 210 and the storage device 220 may perform operations of steps S250 to S265. The operations of steps S250 to S265 may be similar to those of steps S145 to S160 of FIG. 6, and a detailed description thereof may be thus omitted.

In step S270, the host 210 may determine whether selected error logs all are extracted. An operation of step S270 may be similar to that of step S165 of FIG. 6. However, whether all error logs are extracted may be determined in step S165 of FIG. 6, while selected error logs all are extracted may be determined in step S165 of FIG. 9.

In exemplary embodiments, at the debugging operation, a firstly extracted error log may include size information about a selected error log. The host 210 may repeat operations of steps S230 to S270 based on the size information about the selected error log.

In exemplary embodiments, after selected error logs all are transmitted to the host 210, the storage device 220 may send a response to the debugging command CMD_dbg to the host 210. In exemplary embodiments, in the case where the set service primitive (e.g., DME_PEER_SET) is not performed during a specific time by the host 210 (i.e., step S230 is not performed during the specific time), the storage device 220 may issue a check condition to the host 210.

According to an exemplary embodiment of the inventive concept, the host 210 may communicate with the storage device 220 based on the UIC being a lower layer and may extract an error log. That is, even though an upper layer (e.g., the UTP, the AL, the DM, and the like) does not normally operate due to an error thereof, the host 210 may extract error information from the storage device 220 through the UIC being a lower layer, thereby improving the reliability of the user system. Furthermore, the host 210 may selectively extract an error log. For example, the host 210 may selectively extract an error log, associated with a specific layer, specific hardware, or a specific module, from among a plurality of error logs, thereby improving the reliability and performance of the user system.

Figure 10:
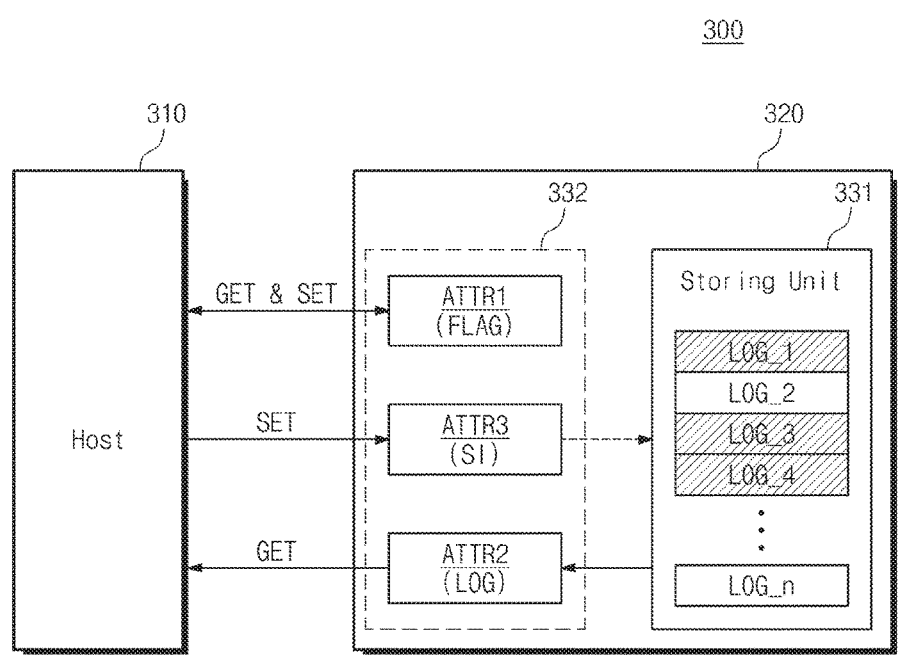
FIG. 10 is a block diagram schematically illustrating a user system according to still another exemplary embodiment of the inventive concept.

FIG. 10 is a block diagram schematically illustrating a user system according to still another exemplary embodiment of the inventive concept. For descriptive convenience, components which are not needed for an error log extracting operation may be omitted. Furthermore, unless otherwise defined, each of first, second, and third attributes ATTR1, ATTR2, and ATTR3 may be assumed as indicating a separate storage circuit for storing information of the above-described atomic unit. Furthermore, it may be assumed that the first attribute ATTR1 stores a flag, the second attribute ATTR2 stores an error log, and the third attribute ATTR3 stores error log selection information.

Furthermore, the first to third attributes ATTR1 to ATTR3 may be included in the UIC of the storage device 320 as described with reference to FIG. 3, and a host 310 or a storage device 320 may read or set the first to third attributes ATTR1 to ATTR3 using the service primitives (e.g., DME_PEER_SET, DME_PEER_GET, and the like). However, the scope and spirit of the inventive concept may not be limited thereto.

Referring to FIG. 10, a user system 300 may include the host 310 and the storage device 320. The storage device 320 may include a storing unit 331 and an extracting unit 332. The host 310, the storage device 320, and the storing unit 331 may be described with reference to FIG. 1, and a detailed description thereof may be thus omitted.

The extracting unit 332 may include the first, second, and third attributes ATTR1, ATTR2, and ATTR3. As described above, the first and second attributes ATTR1 and ATTR2 may be areas for storing a flag and an error log, respectively. The third attribute ATTR3 may be an area for storing information associated with selection of an error log. For example, the host 310 may set information for selecting error information at the third attribute ATTR3 of the storage device 320. The storage device 320 may select an error log, which is to be extracted, from among a plurality of error logs LOG_1 to LOG_n based on information stored in the third attribute ATTR3.

That is, the selector ST of the server device 220 illustrated in FIG. 7 may select an error log based on a debugging command CMD_dbg, while the server device 320 illustrated in FIG. 10 may select an error log, which is to be extracted, based on information set at the third attribute ATTR3, not the debugging command CMD_dbg.

Figure 11:
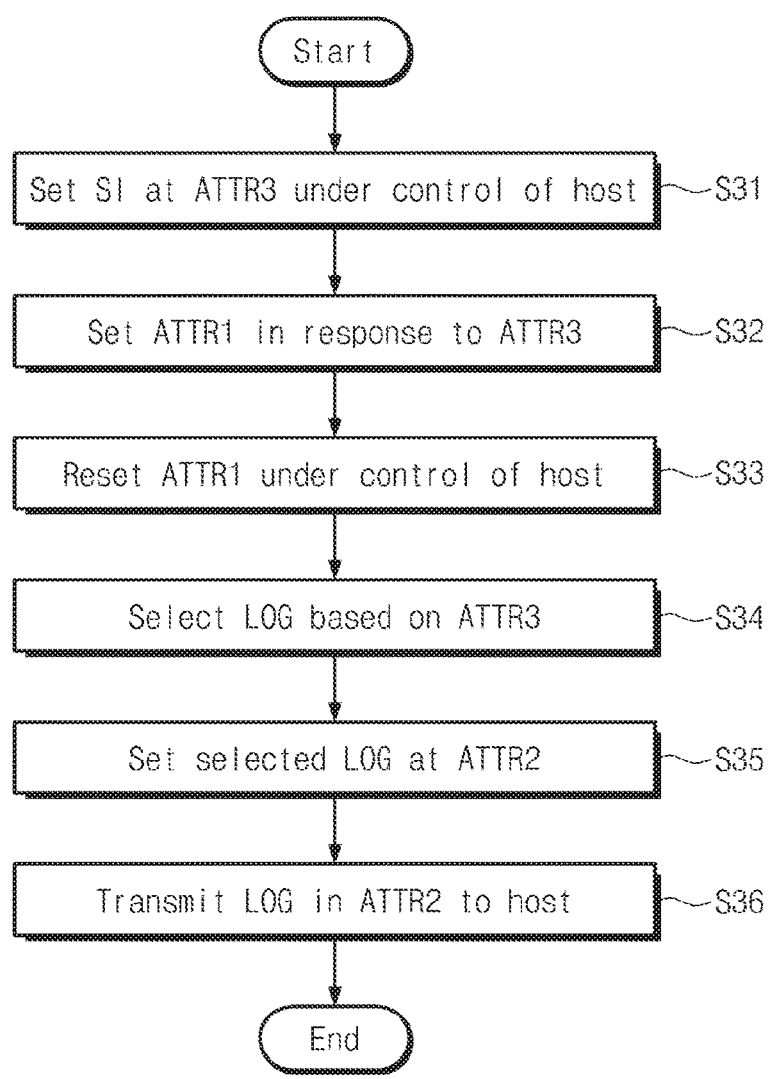
FIG. 11 is a flow chart schematically illustrating an operation of a storage device of FIG. 10.

FIG. 11 is a flow chart schematically illustrating an operation of a storage device of FIG. 10. Referring to FIGS. 10 and 11, in step S31, the storage device 320 may set selection information SI at the third attribute ATT3 in response to control of the host 310. For example, the host 310 may set the selection information SI at the third attribute ATTR3 using the set service primitive (e.g., DME_PEER_

SET). In exemplary embodiments, the selection information SI may indicate information about an error log to be extracted.

In step S32, the storage device 320 may set the first attribute ATTR1 in response to the third attribute ATTR3 thus set. For example, the first attribute ATTR1 may be a flag for transmission and reception of the error log. The storage device 320 may set the first attribute ATTR1 using the set service primitive (e.g., DME_SET).

Afterwards, the storage device 320 may perform an operation of step S33. The operation of step S33 may be similar to those of step S13 of FIG. 5 and step S23 of FIG. 8, and a detailed description thereof may be thus omitted.

In step S34, the storage device 320 may select an error log to be extracted, based on the third attribute ATTR3. For example, the selection information SI may be set at the third attribute ATTR3. The storage device 320 may select an error log, which is to be extracted, from among a plurality of error logs LOG_1 to LOG_n based on the selection information SI.

Afterwards, the storage device 320 may perform operations of steps S35 and S36. The operations of steps S35 and S36 may be similar to those of steps S25 and S26 of FIG. 8, and a detailed description thereof may be thus omitted.

Figure 12:
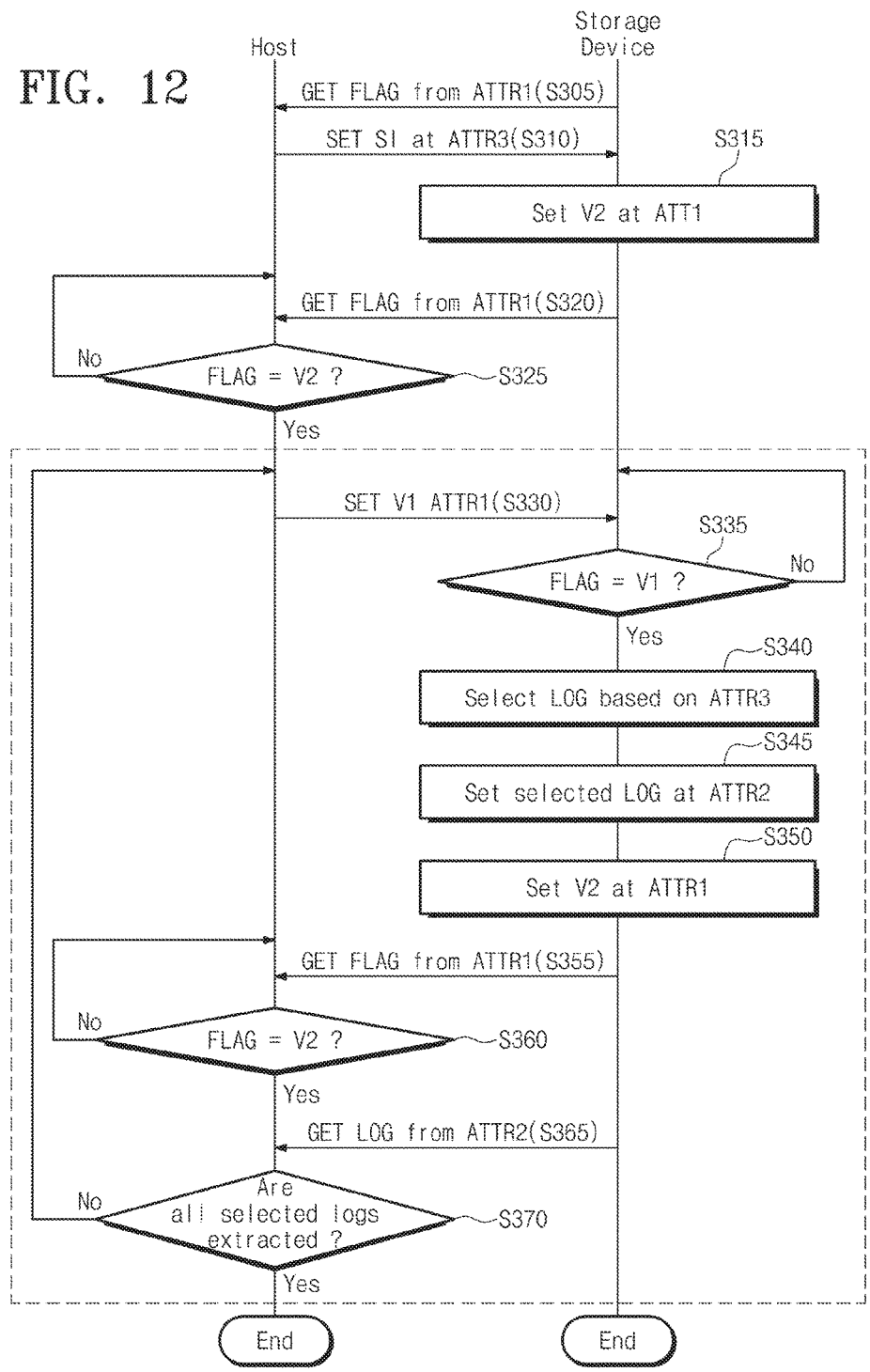
FIG. 12 is a flow chart illustrating a detailed operation of a user system of FIG. 10.

FIG. 12 is a flow chart illustrating a detailed operation of a user system of FIG. 10. Referring to FIGS. 10 and 12, in step S305, the host 310 may get a flag from the first attribute ATTR1 of the server device 320. An operation of step S305 may be similar to that of step S105 of FIG. 6, and a detailed description thereof may be thus omitted.

In step S310, the host 310 may set selection information SI at the third attribute ATTR3 of the storage device 320. For example, the host 310 may set the selection information SI at the third attribute ATTR3 using the set service primitive (e.g., DME_PEER_SET). The selection information SI may include information about an error log to be extracted.

The host 310 and the storage device 320 may perform operations of steps S315 to S335. The operations of steps S315 to S335 may be similar to those of S215 to S235 of FIG. 9, and a detailed description thereof may be thus omitted.

In step S340, the storage device 320 may select an error log based on the third attribute ATTR3. For example, the storage device 320 may select an error log, which is to be extracted, from among a plurality of error logs LOG_1 to LOG_n based on the selection information SI set at the third attribute ATTR3.

Afterward, the host 310 and the storage device 320 may perform operations of steps S345 to S370. The operations of steps S345 to S370 may be similar to those of steps S245 to S270 of FIG. 9, and a detailed description thereof may be thus omitted.

In exemplary embodiments, after selected error logs all are transmitted to the host 310, the storage device 320 may send an operation-complete response to the host 210. In exemplary embodiments, in the case where the set service primitive (e.g., DME_PEER_SET) is not performed during a specific time by the host 310 (i.e., step S330 is not performed during the specific time), the storage device 320 may issue a check condition to the host 310.

According to another exemplary embodiment of the inventive concept, the host 310 may perform an error log extracting operation by setting error information SI, which is used to select an error log to be extracted, to the third attribute ATTR3. Therefore, it may be possible to provide a user system with improved reliability and performance.

Figure 13:
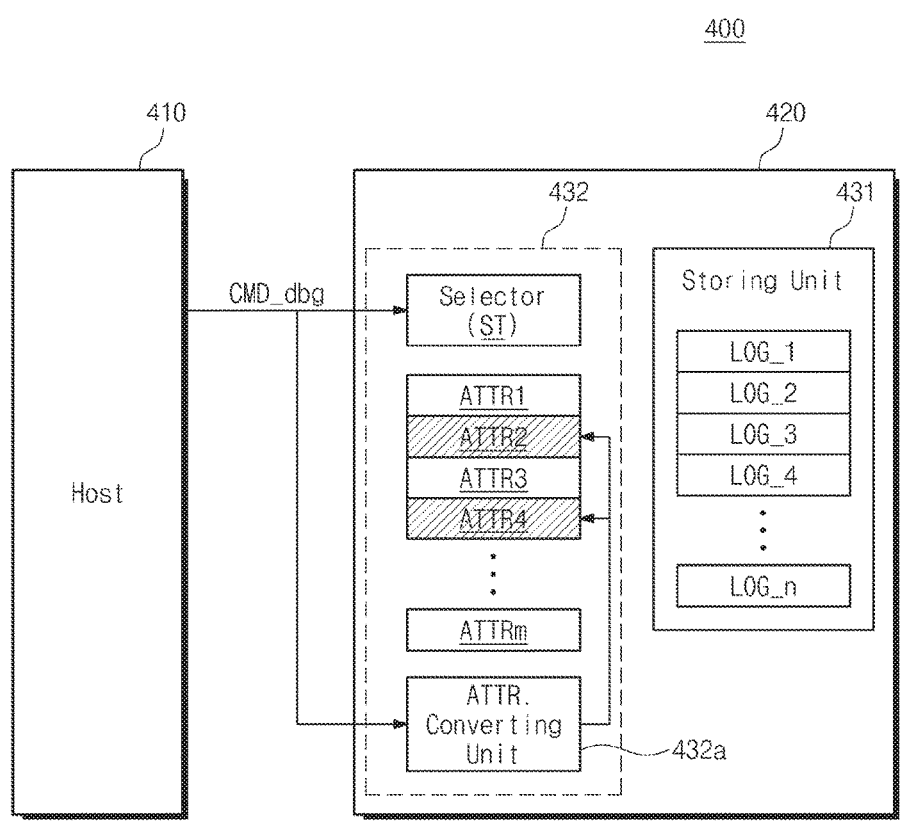
FIG. 13 is a block diagram schematically illustrating a user system according to a further exemplary embodiment of the inventive concept.

FIG. 13 is a block diagram schematically illustrating a user system according to a further exemplary embodiment of the inventive concept. For descriptive convenience, components which are not needed for an error log extracting operation may be omitted. Unless otherwise defined, each of a plurality of attributes ATTR1 to ATTRm may be assumed as indicating a separate storage circuit for storing information of the above-described atomic unit. Each of the plurality of attributes ATTR1 to ATTRm may be an area for storing information about a storage device 420 or an area for storing information about each of layers.

Furthermore, the plurality of attributes ATTR1 to ATTRm may be included in the UIC of the storage device 420 as described with reference to FIG. 3, and the host 410 or the storage device 420 may read or set the plurality of attributes ATTR1 to ATTRm using the service primitives (e.g., DME_PEER_SET, DME_PEER_GET, and the like). However, the scope and spirit of the inventive concept may not be limited thereto.

Referring to FIG. 13, a user system 400 may include the host 410 and the storage device 420. The storage device 420 may include a storing unit 431 and an extracting unit 432. The storing unit 431 may store a plurality of error logs LOG_1 to LOG_n.

The extracting unit 432 may include a selector ST, the plurality of attributes ATTR1 to ATTRm, and an attribute converting unit 432a. The selector ST may be described with reference to FIG. 7, and a detailed description thereof may be thus omitted.

Each of the plurality of attributes ATTR1 to ATTRm, as described above, may be an area for storing information about the storage device 420 or an area for storing information about each of layers. Each of the plurality of attributes ATTR1 to ATTRm may be set or read by the host 410 or the storage device 420.

As described with reference to FIGS. 1 to 12, the host 410 and the storage device 420 may perform an error log extracting operation. In FIGS. 1 to 12, embodiments of the inventive concept are exemplified as attributes for storing a flag and an error log are previously set. However, the attribute converting unit 432a of the storage device 420 of FIG. 13 may select attributes, which respectively store a flag and an error log, from among a plurality of attributes ATTR1 to ATTRm, based on a debugging command CMD_dbg. For example, the debugging command CMD_dbg may include attribute selection information. The attribute selection information may indicate information for selecting attributes for an error log and a flag among the plurality of attributes ATTR1 to ATTRm. As illustrated in FIG. 13, the attribute converting unit 432a may select the second and fourth attributes ATTR2 and ATTR4 for an error log and a flag, based on the attribute selection information.

The host 410 and the storage device 420 may perform an error log extracting operation, which is described with reference to FIGS. 1 to 12, using the selected attributes ATTR2 and ATTR4.

Figure 14:
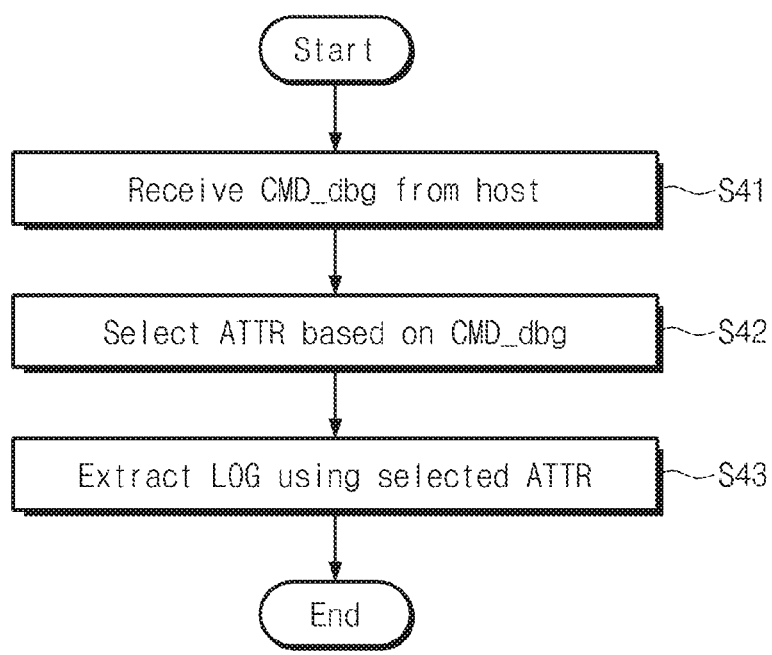
FIG. 14 is a flow chart schematically illustrating an operation of a storage device of FIG. 13.

FIG. 14 is a flow chart schematically illustrating an operation of a storage device of FIG. 13. Referring to FIGS. 13 and 14, the storage device 420 may receive a debugging command CMD_dbg from the host 410.

In step S42, the storage device 420 may select an attribute based on the received debugging command CMD_dbg. For example, as described above, the storage device 420 may select attributes for a flag and an error log among a plurality of attributes ATTR1 to ATTRm, based on the received debugging command CMD_dbg.

In step S43, the storage device 420 may extract an error log using the selected attributes. For example, the storage device 420 may perform an error log extracting operation, which is described with reference to FIGS. 1 to 12, using the selected attributes.

Figure 15:
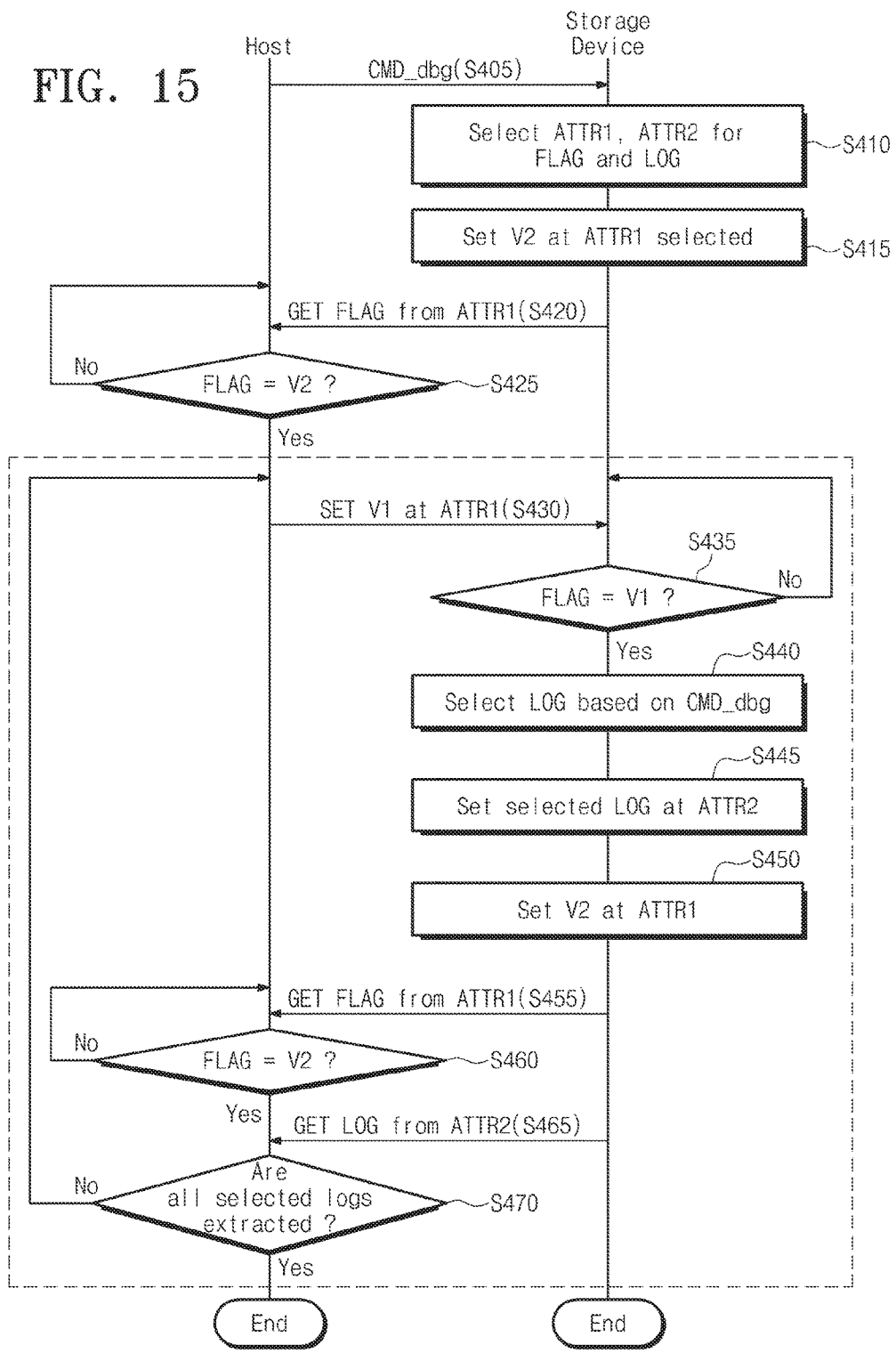
FIG. 15 is a flow chart illustrating a detailed operation of a user system of FIG. 13.

FIG. 15 is a flow chart illustrating a detailed operation of a user system of FIG. 13. Referring to FIGS. 13 and 15, in step S405, the host 410 may issue a debugging command CMD_dbg to the storage device 420. In exemplary embodiments, the debugging command CMD_dbg may include information for selecting attributes for a flag and an error log among a plurality of attributes ATTR1 to ATTRm.

In step S410, the storage device 420 may select attributes for a flag and an error log among a plurality of attributes ATTR1 to ATTRm, based on the received debugging command CMD_dbg. For descriptive convenience, it may be assumed that the first attribute ATTR1 selected from the plurality of attributes ATTR1 to ATTRm is an attribute for the flag and the second attribute ATTR2 selected from the plurality of attributes ATTR1 to ATTRm is an attribute for the error log. However, the scope and spirit of the inventive concept may not be limited thereto. For example, other attributes may be selected.

Afterwards, the host 410 and the storage device 420 may perform operations of steps S415 to S470 using the first and second attributes ATTR1 and ATTR2 thus selected. Operations of the steps S415 to S470 may be similar to those of steps S215 to S270 of FIG. 9, and a detailed description thereof may be thus omitted.

In exemplary embodiments, after selected error logs all are transmitted to the host 410, the storage device 420 may send a response to the debugging command CMD_dbg to the host 410. In exemplary embodiments, in the case where the set service primitive (e.g., DME_PEER_SET) is not performed during a specific time by the host 410 (i.e., step S430 is not performed during the specific time), the storage device 420 may issue a check condition to the host 410.

According to exemplary embodiments of the inventive concept, each of a host and a storage device may include a multi-layer structure. In the case where communication between the host and the storage device is not normally performed due to an error of an upper layer, the host and the storage device may extract an error log using communication with a lower layer. For example, the host and the storage device may extract an error log using attributes included in a physical layer. Furthermore, the host may select an error log, which is to be extracted, among a plurality of error logs. The host may also select attributes, which are to be used for extraction of an error log, from among attributes included in the physical layer. Therefore, it may be possible to provide a user system with improved performance and reliability.

Figure 16:
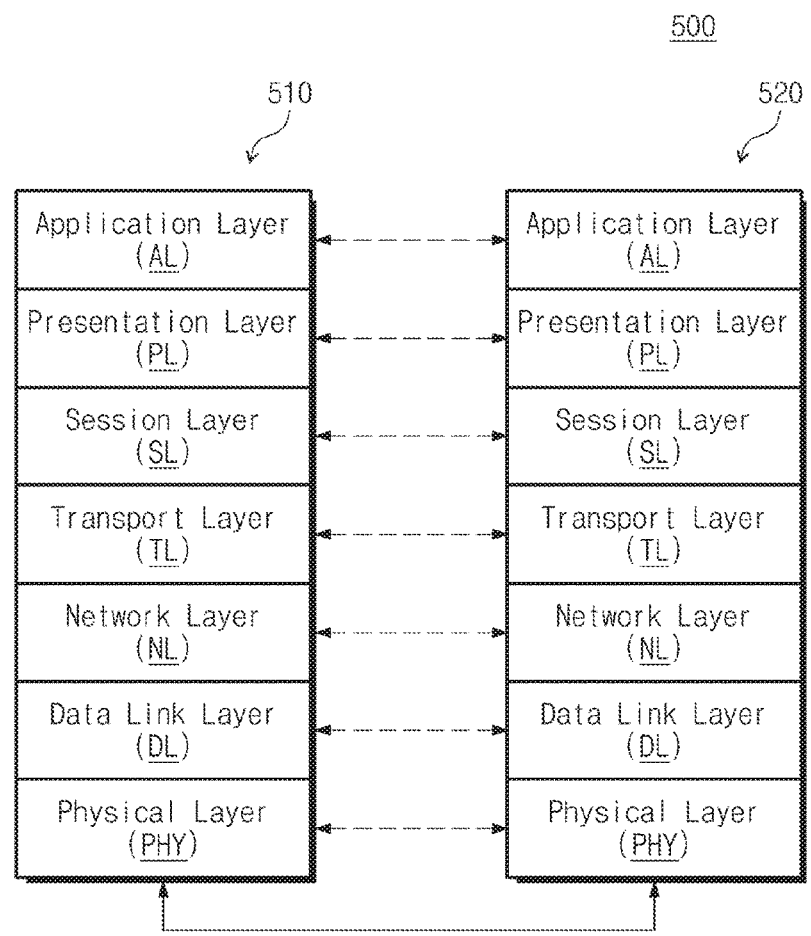
FIG. 16 is a diagram schematically illustrating a layer structure of a user system according to another exemplary embodiment of the inventive concept.

FIG. 16 is a diagram schematically illustrating a layer structure of a user system according to another exemplary embodiment of the inventive concept. Referring to FIG. 16, a user system 500 may include a host 510 and a storage device 520.

In exemplary embodiments, the host 510 and the storage device 520 of the user system 500 of FIG. 16 may communicate with each other based on an OSI (Open System Interconnection) 7-layer structure that the international standard organization proposes. For example, each of the host 510 and the storage device 520 may include an application layer (hereinafter referred to as "AL"), a presentation layer (hereinafter referred to as "PL"), a session layer (hereinafter referred to as "SL"), a transport layer (hereinafter referred to as "TL"), a network layer (hereinafter referred to as "NL"), a data link layer (hereinafter referred to as "DLL"), and a physical layer (hereinafter referred to as "PL").

Layers of the host 510 may logically or physically communicate with corresponding layers of the storage device 520. For example, the AL of the host 510 may logically or physically communicate with the AL of the storage device 520. Alternatively, the PL of the host 510 may logically or physically communicate with the PL of the storage device 520. Likewise, the SL, TL, NL, DL, and PHY of the host 510 may logically or physically communicate with the SL, TL, NL, DL, and PHY of the storage device 520, respectively.

In exemplary embodiments, in the case where an error arises from at least one of the layers of the storage device 520, logical or physical communication of the layer from which the error arises may be interrupted. The user system 500 according to an exemplary embodiment of the inventive concept, as described above, may extract an error log based on physical or logical communication of other layers, not the layer from which the error arises. For example, in the case where an error occurs from the PL of the storage device 520, the host 510 and the storage device 520 may extract an error log about the PL of the storage device 520 based on physical or logical communication of the AL, PL, SL, NL, DL, or PHY.

According to an exemplary embodiment of the inventive concept, physical or logical communication between the host 510 and the storage device 520 of the user system 500 may be based on the OSI 7-layer structure. In this case, if an error occurs from at least one layer of the OSI 7-layer structure, the host 510 and the storage device 520 of the user system 500 may extract an error log based on physical or logical communication between other layers from which at least one error does not arise. Therefore, it may be possible to provide a user system with improved reliability.

An embodiment of the inventive concept is exemplified as an OSI 7-layer structure is applied to a user system. However, the scope and spirit of the inventive concept may not be limited thereto. For example, the user system according to an exemplary embodiment of the inventive concept may be applied to a multi-layer structure such as TCP/IP protocol.

Figure 17:
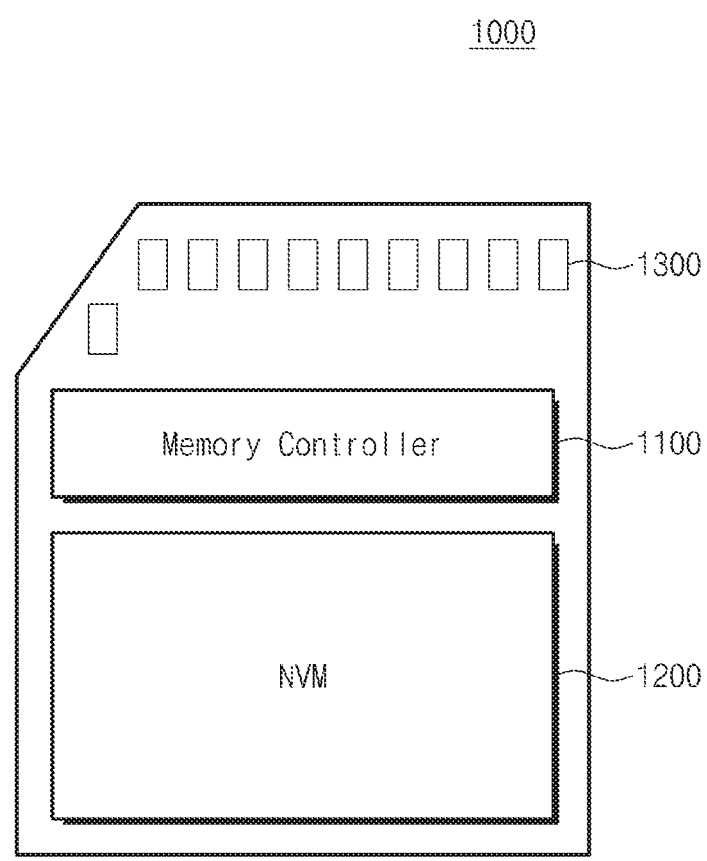
FIG. 17 is a block diagram schematically illustrating a memory card system including a nonvolatile memory system according to embodiments of the inventive concept.

FIG. 17 is a block diagram schematically illustrating a memory card system including a nonvolatile memory system according to embodiments of the inventive concept. Referring to FIG. 17, a memory card system 1000 may contain a controller 1100, a nonvolatile memory 1200, and a connector 1300.

The controller 1100 may be connected to the nonvolatile memory 1200. The controller 1100 may be configured to access the nonvolatile memory 1200. For example, the controller 1100 may be adapted to control an overall operation of the nonvolatile memory 1200 including, but not limited to, a read operation, a write operation, an erase operation, and a background operation. The background operation may include the following operations: wear-leveling management, garbage collection, and the like.

The controller 1100 may provide an interface between the nonvolatile memory 1200 and a host. The controller 1100 may be configured to drive firmware for controlling the nonvolatile memory 1200.

In exemplary embodiments, the controller 1100 may include components such as, but not limited to, a RAM, a processing unit, a host interface, a memory interface, and an error correction unit.

The controller 1100 may communicate with an external device through the connector 1300. The controller 1100 may communicate with an external device based on a specific communication protocol. For example, the controller 1100 may communicate with the external device through at least one of various interface protocols such as, but not limited to, universal serial bus (USB), multimedia card (MMC), eMMC (embedded MMC), peripheral component interconnection (PCI), PCI-express (PCI-E), advanced technology attachment (ATA), a serial-ATA, parallel-ATA, small computer small interface (SCSI), enhanced small disk interface (ESDI), integrated drive electronics (IDE), UFS (Universal Flash Storage), Wi-Fi, Bluetooth, NVMe, and Firewire.

In exemplary embodiments, the controller 1100 may communicate with the external device (i.e., a host) based on an operation method described with reference to FIGS. 1 to 15 and may transmit an error log to the external device.

The nonvolatile memory 1200 may be implemented with a variety of nonvolatile memory devices, such as, but not limited to, an EPROM, a NAND flash memory, a NOR flash memory, a PRAM, a ReRAM, a FRAM, and an STT-MRAM.

In exemplary embodiments, the controller 1100 and the nonvolatile memory 1200 may be integrated in a single semiconductor device. The controller 1100 and the nonvolatile memory 1200 may be integrated in a single semiconductor device to form a solid state drive (SSD). The controller 1100 and the nonvolatile memory 1200 may be integrated in a single semiconductor device to form a memory card such as, but not limited to, a PC card (PCM-CIA, personal computer memory card international association), a compact flash card (CF), a smart media card (SM, SMC), a memory stick, a multimedia card (MMC, RS-MMC, MMCmicro), an SD card (SD, miniSD, microSD, SDHC), and a universal flash storage (UFS).

The controller 1100 or the nonvolatile memory 1200 may be packaged according to any of a variety of different packaging technologies. Examples of such packaging technologies may include PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP). Alternatively, the nonvolatile memory 1200 may include a plurality of nonvolatile memory chips, which are implemented in one of the above-described packaging technologies.

Figure 18:
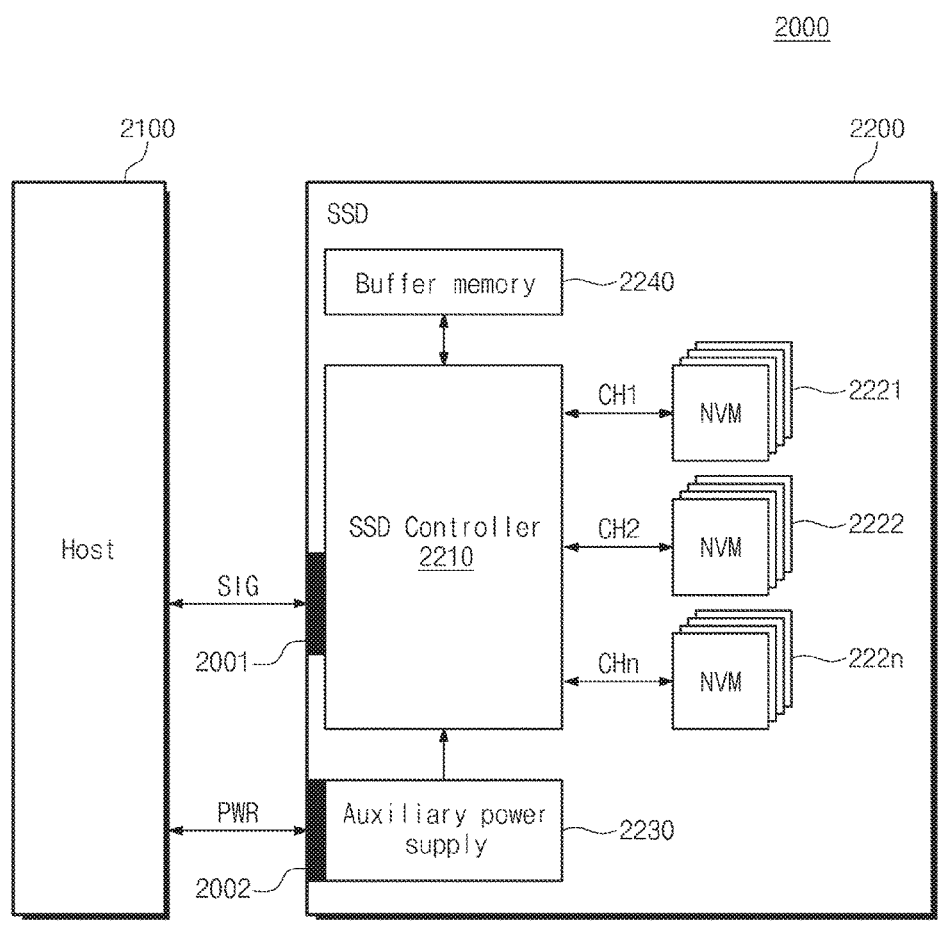
FIG. 18 is a block diagram illustrating a solid state drive including a nonvolatile memory system according to an embodiment of the inventive concept.

FIG. 18 is a block diagram illustrating a solid state drive including a nonvolatile memory system according to an embodiment of the inventive concept. Referring to FIG. 18, a solid state drive (SSD) system 2000 may include a host 2100 and an SSD 2200. The SSD 2200 may exchange signals SIG with the host 2100 through the host interface 2001 and may be supplied with power PWR through a power connector 2002. The SSD 2200 may include an SSD controller 2210, a plurality of flash memories 2221 to 222n, an auxiliary power supply 2230, and a buffer memory 2240.

The SSD controller 2210 may control the flash memories 2221 to 222n through a plurality of channels CH1 to CHn in response to a signal SIG from the host 2100. The flash memories 2221 to 222n may perform a program operation in response to control of the SSD controller 2210. In exemplary embodiments, the SSD controller 2210 may communicate with the host 2100 based on an operation method described with reference to FIGS. 1 to 15 and may transmit an error log to the host 2100.

The auxiliary power supply 2230 may be connected to the host 2100 via the power connector 2002. The auxiliary power supply 2230 may be charged by a power PWR from the host 2100. When a power is not smoothly supplied from the host 2100, the auxiliary power supply 2230 may power the SSD system 2000. The auxiliary power supply 2230 may be placed inside or outside the SSD 2200. For example, the auxiliary power supply 2230 may be put on a main board to supply an auxiliary power to the SSD 2200.

The buffer memory 2240 may act as a buffer memory of the SSD 2200. For example, the buffer memory 2240 may temporarily store data received from the host 2100 or from the flash memories 2221 to 222n or may temporarily store metadata (e.g., mapping tables) of the flash memories 2221 to 322n. The buffer memory 2240 may include volatile memories such as DRAM, SDRAM, DDR SDRAM, LPDDR SDRAM, SRAM, and the like or nonvolatile memories such as FRAM, ReRAM, STT-MRAM, PRAM, and the like.

Figure 19:
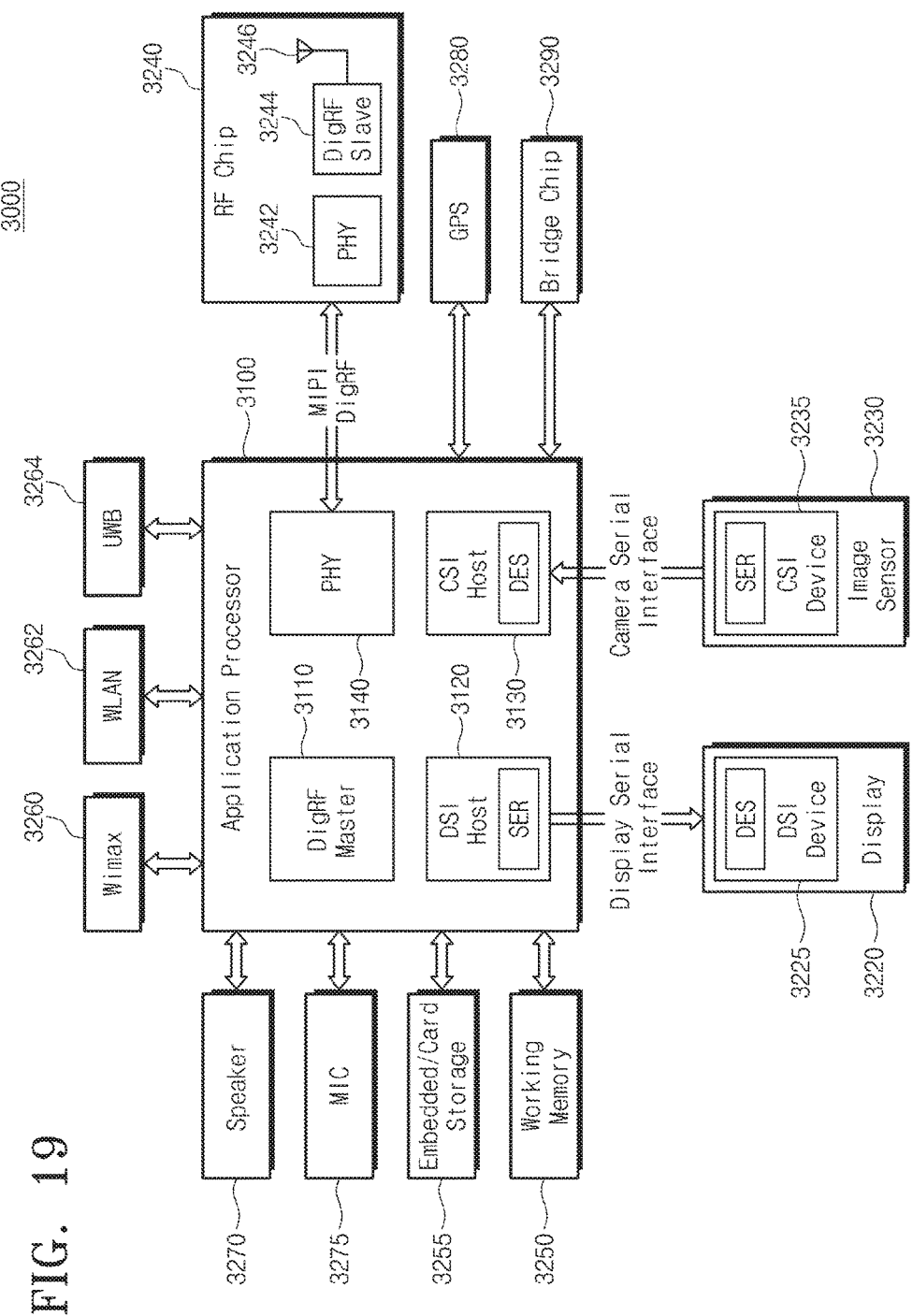
FIG. 19 is a block diagram schematically illustrating an electronic system including a storage device according to an embodiment of the inventive concept.

FIG. 19 is a block diagram schematically illustrating an electronic system including a storage device according to an embodiment of the inventive concept. Referring to FIG. 19, an electronic system 3000 may be implemented with a data processing device (e.g., cellular phone, PDA, PMP, smartphone, or wearable device) using or supporting an MIPI (Mobile Industry Processor Interface) interface that the MIPI Alliance proposes.

The electronic system 3000 may include an application processor 3100, a display 3220, and an image sensor 3230. The application processor 3100 may include a DigRF master 3110, a DSI (Display Serial Interface) host 3120, a CSI (Camera Serial Interface) host 3130, and a physical layer 3140.

The DSI host 3120 may communicate with a DSI device 3225 of the DSI device 3225 based on the DSI. For example, an optical serializer SER may be implemented in the DSI host 3120, and an optical de-serializer DES may be implemented in the DSI device 3225.

The CSI host 3130 may communicate with a CSI device 3235 of the image sensor 3230 according to CSI. An optical serializer SER may be implemented in the CSI host 3130, and an optical de-serializer DES may be implemented in the CSI device 3235.

DSI and CSI may use a physical layer and a link layer. Embodiments of the inventive concept may be applied to the DSI and CSI. For example the DSI host 3120 and the DSI device 3225 may selectively extract an error log via P2P communication between the physical layer and the logical layer. In addition, the CSI device 3225 and the CSI host 3130 may selectively extract an error log via P2P communication between the physical layer and the logical layer.

The electronic device 3000 may further include a radio frequency (RF) chip 3240 capable of communicating with the application processor 3100. The RF chip 3240 may include a physical layer 3242, a DigRF slave 3244, and an antenna 3246. For example, the physical layer 3242 of the RF chip 3240 and a physical layer 3140 of the application processor 3100 may exchange data through a DigRF interface proposed by the MIPI Alliance.

The electronic system 3000 may further include a working memory 3250 and embedded/card storage 3255. The working memory 3250 and the embedded/card storage 3255 may store data provided from the application processor 3100. Also, the working memory 3250 and the embedded/card storage 3255 may provide data stored therein to the application processor 3100.

The working memory 3250 may temporarily store data to be processed or processed by the application processor 3100. The working memory 3250 may include a nonvolatile memory, such as flash memory, PRAM, MRAM, ReRAM, or FRAM, or a volatile memory, such as SRAM, DRAM, or SDRAM.

The embedded/card storage 3255 may store data regardless of whether a power is supplied. In exemplary embodiments, the embedded/card storage 3255 may comply with the UFS interface protocol. However, the spirit and scope of the inventive concept may not be limited thereto. The embedded/card storage 3255 which is based on an operation method described with reference to FIGS. 1 to 15 may extract an error log in response to control (in other words, control for P2P communication of a physical layer) of the application processor 3100.

The electronic system 3000 may communicate with an external system (not shown) using the following: Wimax (World Interoperability for Microwave Access) 3260, WLAN (Wireless Local Area Network) 3262, and UWB (Ultra Wideband) 3264.

The electronic system 3000 may further include a speaker 3270 and a microphone 3275 to process voice information. The electronic system 3000 may further include a GPS (Global Positioning System) device 3280 for processing position information. The electronic system 3000 may further include a bridge chip 3290 for managing connection with peripheral devices.

In exemplary embodiments, components, which communicate with the application processor 3100 based on the MIPI Unipro, from among components included in the electronic system 3000 may support an error log extracting operation according to an exemplary embodiment of the inventive concept.

According to exemplary embodiments of the inventive concept, a user system may extract an error log about a storage device based on communication of a lower layer (i.e., a physical layer), thereby improving the reliability and performance thereof.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An operation method of a storage device that comprises a physical layer and a storing unit configured to store a plurality of error logs, and that is configured to communicate a signal with a host via the physical layer, the operation method comprising:
   receiving, by the storage device, a debugging command from the host;
   setting, by the storage device, a first value at a first attribute included in the physical layer in response to the debugging command;
   setting, by the storage device, a second value different from the first value at the first attribute in response to control of the host;
   setting one error log of the plurality of error logs at a second attribute based on the first attribute at which the second value is set;
   transmitting the error log that is set at the second attribute from the storage device to the host in response to control of the host; and
   determining whether all the plurality of error logs are transmitted to the host; and
   when all the error logs are transmitted to the host, transmitting a response to the debugging command to the host, wherein the response to the debugging command is transmitted to the host even when a layer higher than the physical layer does not operate normally due to an error reported in at least one of the plurality of error logs.

2. The operation method of claim 1, wherein the setting of the one error log of the plurality of error logs comprises:
   selecting a group of the error logs as selected error logs based on the debugging command; and
   setting one of the selected error logs in the group at the second attribute.

3. The operation method of claim 2, further comprising:
   determining whether all the selected error logs of the group are transmitted to the host; and
   when all the selected error logs of the group are transmitted to the host, transmitting a response to the debugging command to the host.

4. The operation method of claim 1, further comprising:
   selecting the first attribute and second attribute among a plurality of attributes included in an interconnection layer in response to the debugging command.

5. The operation method of claim 1, wherein the storage device generates an interrupt in response to the debugging command; and
   wherein the debugging command comprises at least one of a maker command, a reserved command, and a combination thereof.

6. The operation method of claim 1, wherein the debugging command comprises at least one of a bit combination, an identification code, and a device ID discriminated by the physical layer.

7. The operation method of claim 1, wherein the first attribute indicates a storage area for storing a flag informing that the error logs are updated at the second attribute; and
   wherein the second attribute indicates a storage area for storing an error log, which is to be transmitted to the host, from among the plurality of error logs.

8. The operation method of claim 1, wherein the host and the storage device communicate with each other based on a universal flash storage (UFS) communication protocol.

9. The operation method of claim 8, wherein the physical layer is a UFS interconnection layer and the first attribute and second attribute are included in a unified protocol (Unipro).

10. An operation method of a user system that comprises a host device including a first physical layer and a storage device including a second physical layer, the operation method comprising:
    getting a first value from a first attribute included in the second physical layer of the storage device, by the host device;
    transmitting a debugging command to the storage device, by the host device;
    setting, by the storage device, a second value at the first attribute in response to the debugging command;
    determining whether the first attribute is the second value and resetting the first attribute with the first value when the first attribute is determined to be the second value, through the host device;

determining whether the first attribute is the first value, setting an error log, which is to be extracted as a to-be-extracted error log, at a second attribute included in the second physical layer when the first attribute is the first value, and setting the second value at the first attribute, through the storage device; and determining whether the first attribute is the second value and getting the to-be-extracted error log from the second attribute when the first attribute is the second value;

wherein the first physical layer of the host device and the second physical layer of the storage device communicate with each other based on a peer to peer (P2P) communication wherein a response to the debugging command is received by the host device from the storage device even when a layer higher than the second physical layer of the storage device does not operate normally due to an error reported in the error log.

11. The operation method of claim 10, further comprising:
determining whether all error logs are extracted from the storage device, by the host device; and
when at least one of the error logs is not extracted from the storage device, setting the first value at the first attribute, by the host device.

12. The operation method of claim 10, wherein the determining of whether the first attribute is the first value, the setting of the error log, and the setting of the second value comprises:
determining whether the first attribute is the first value and selecting, when the first attribute is the first value, the to-be-extracted error log as a selected error log among a plurality of error logs based on the debugging command, through the storage device; and
setting the selected error log at the second attribute by the storage device.

13. The operation method of claim 10, wherein the host device and the storage device communicate with each other based on a universal flash storage (UFS) communication protocol.

14. The operation method of claim 13, wherein each of the first physical layer and the second physical layer is a universal flash storage (UFS) interconnection layer and the first attribute and second attribute are included in a Mobile Industry Processor Interface (MIPI) universal protocol (Unipro) and M-PHY.

15. An operation method of a storage device that comprises a storing unit configured to store a plurality of error logs, the operation method comprising:

receiving, by the storage device, a debugging command from a host;

setting, by the storage device, a first value at a first attribute included in a physical layer of the storage device in response to the debugging command;

setting, by the storage device, a second value different from the first value at the first attribute in response to control of the host;

setting, by the storage device, one error log of the plurality of error logs at a second attribute included in the physical layer based on the first attribute at which the second value is set; and transmitting the error log that is set at the second attribute from the storage device to the host;

wherein the first attribute indicates a storage area for storing a flag indicating that the one error log of the plurality of error logs are updated at the second attribute; and wherein the second attribute indicates a storage area for storing the one error log that is to be transmitted to the host, wherein the error log is transmitted from the storage device to the host in response to the debugging command even when a layer higher than the physical layer does not operate normally due to an error reported in at least one of the plurality of error logs.

16. The operation method of claim 15, further comprising:
determining whether all the plurality of error logs are transmitted to the host; and
when all the error logs are transmitted to the host, transmitting a response to the debugging command to the host.

17. The operation method of claim 15, wherein the setting of the one error log of the plurality of error logs comprises:
selecting a group of the error logs as selected error logs based on the debugging command; and
setting one of the selected error logs in the group at the second attribute.

18. The operation method of claim 17, further comprising:
determining whether all the selected error logs of the group are transmitted to the host; and
when all the selected error logs of the group are transmitted to the host, transmitting a response to the debugging command to the host.

19. The operation method of claim 15, wherein the host and the storage device communicate with each other based on a universal flash storage (UFS) communication protocol.

* * * * *